United States Patent
Sang et al.

(10) Patent No.: US 11,135,818 B2
(45) Date of Patent: *Oct. 5, 2021

(54) PREGELATINIZED STARCH WITH MID-RANGE VISCOSITY, AND PRODUCT, SLURRY AND METHODS RELATED THERETO

(71) Applicant: United States Gypsum Company, Chicago, IL (US)

(72) Inventors: Yijun Sang, Oak Park, IL (US); Weixin D. Song, Shanghai (CN)

(73) Assignee: UNITED STATES GYPSUM COMPANY, Chicago, IL (US)

(*) Notice: Subject to any disclaimer, the term of this patent is extended or adjusted under 35 U.S.C. 154(b) by 97 days.

This patent is subject to a terminal disclaimer.

(21) Appl. No.: 16/554,298

(22) Filed: Aug. 28, 2019

(65) Prior Publication Data

US 2020/0024190 A1  Jan. 23, 2020

Related U.S. Application Data

(63) Continuation of application No. 13/835,002, filed on Mar. 15, 2013, now Pat. No. 10,399,899.

(60) Provisional application No. 61/717,588, filed on Oct. 23, 2012.

(51) Int. Cl.
  *B32B 27/08* (2006.01)
(52) U.S. Cl.
  CPC ....... *B32B 27/08* (2013.01); *Y10T 428/31971* (2015.04)
(58) Field of Classification Search
  CPC .............. B32B 27/08; C04B 2103/10; C04B 2103/20; C04B 2103/40; C04B 2111/0062; C04B 22/16; C04B 24/38; C04B 24/42; C04B 28/14; E04C 2/043; Y10T 428/31971
  See application file for complete search history.

(56) References Cited

U.S. PATENT DOCUMENTS

| | | |
|---|---|---|
| 1,769,519 A | 7/1930 | King et al. |
| 2,319,637 A | 5/1943 | Schopmeyer et al. |
| 2,657,163 A | 10/1953 | Ericks |
| 2,965,528 A | 12/1960 | Loechl |
| 3,179,529 A | 4/1965 | Hickey et al. |
| 3,251,702 A | 5/1966 | Stickley et al. |
| 3,573,947 A | 4/1971 | Kinkade et al. |
| 3,652,294 A | 3/1972 | Marotta et al. |

(Continued)

FOREIGN PATENT DOCUMENTS

| | | |
|---|---|---|
| AU | 2014329817 | 4/2015 |
| CA | 2320637 | 4/2001 |

(Continued)

OTHER PUBLICATIONS

Examination Report No. 1 for Australian Application No. 2013335106 dated Mar. 7, 2017. (4 pages).

(Continued)

*Primary Examiner* — Michael B Nelson
(74) *Attorney, Agent, or Firm* — Greer, Burns & Crain, Ltd.; Philip T. Petti; Pradip Sahu (57) ABSTRACT

Disclosed are product (e.g., panels), slurry, and methods relating to a pregelatinized starch having a mid-range viscosity (i.e., from about 20 centipoise to about 700 centipoise).

20 Claims, 1 Drawing Sheet

(56) References Cited

U.S. PATENT DOCUMENTS

| | | |
|---|---|---|
| 3,671,264 A | 6/1972 | Drews et al. |
| 3,908,062 A | 9/1975 | Roberts |
| 4,009,062 A | 2/1977 | Long |
| 4,138,271 A | 2/1979 | Toshiaki et al. |
| 4,239,716 A | 12/1980 | Ishida et al. |
| 4,328,178 A | 5/1982 | Kossatz |
| 4,392,896 A | 7/1983 | Sakakibara |
| 4,455,271 A | 6/1984 | Johnson |
| 4,465,702 A | 8/1984 | Eastman et al. |
| 4,585,685 A | 4/1986 | Forry et al. |
| 4,645,548 A | 2/1987 | Take et al. |
| 4,661,161 A | 4/1987 | Jakacki et al. |
| 4,965,031 A | 10/1990 | Conroy |
| 5,085,929 A | 2/1992 | Bruce et al. |
| 5,100,475 A | 3/1992 | Wursch et al. |
| 5,227,100 A | 7/1993 | Koslowski et al. |
| 5,320,677 A | 6/1994 | Baig |
| 5,435,851 A | 7/1995 | Kasica et al. |
| 5,534,059 A | 7/1996 | Immordino, Jr. |
| 5,643,510 A | 7/1997 | Sucech |
| 5,683,635 A | 11/1997 | Sucech et al. |
| 5,683,772 A | 11/1997 | Anderson |
| 5,688,845 A | 11/1997 | Eden et al. |
| 5,746,822 A | 5/1998 | Espinoza et al. |
| 5,817,262 A | 10/1998 | Englert |
| 5,868,824 A | 2/1999 | Andersen et al. |
| 5,922,447 A | 7/1999 | Baig |
| 6,010,596 A | 1/2000 | Song |
| 6,030,673 A | 2/2000 | Andersen et al. |
| 6,342,284 B1 | 1/2002 | Yu et al. |
| 6,359,040 B1 | 3/2002 | Burdick |
| 6,406,537 B1 | 6/2002 | Immordino |
| 6,409,824 B1 | 6/2002 | Veeramasuneni et al. |
| 6,409,825 B1 | 6/2002 | Yu et al. |
| 6,443,258 B1 | 9/2002 | Putt et al. |
| 6,494,609 B1 | 12/2002 | Wittbold et al. |
| 6,588,254 B1 | 7/2003 | Foster et al. |
| 6,613,424 B1 | 9/2003 | Putt et al. |
| 6,632,550 B1 | 10/2003 | Yu et al. |
| 6,699,364 B2 | 3/2004 | Song et al. |
| 6,752,895 B1 | 6/2004 | Song et al. |
| 6,805,741 B1 | 10/2004 | Liu et al. |
| 6,815,049 B2 | 11/2004 | Veeramasuneni et al. |
| 6,822,033 B2 | 11/2004 | Yu et al. |
| 6,874,930 B2 | 4/2005 | Wittbold et al. |
| 6,893,752 B2 | 5/2005 | Veeramasuneni et al. |
| 7,048,794 B2 | 5/2006 | Tagge et al. |
| 2,894,589 A1 | 5/2007 | Wimmer et al. |
| 7,364,015 B2 | 4/2008 | Englert et al. |
| 7,364,676 B2 | 4/2008 | Sucech et al. |
| 7,413,603 B2 | 8/2008 | Miller et al. |
| 7,731,794 B2 | 6/2010 | Yu et al. |
| 7,736,720 B2 | 6/2010 | Yu et al. |
| 7,771,851 B2 | 8/2010 | Song et al. |
| 7,803,296 B2 | 9/2010 | Miller et al. |
| 7,851,057 B2 | 12/2010 | Englert et al. |
| 7,862,687 B2 | 1/2011 | Englert et al. |
| 8,030,377 B2 | 10/2011 | Dubey et al. |
| 8,038,790 B1 | 10/2011 | Dubey et al. |
| 8,057,915 B2 | 11/2011 | Song et al. |
| 8,062,565 B2 | 11/2011 | Mueller et al. |
| 8,062,741 B2 | 11/2011 | Tonyan et al. |
| 8,070,895 B2 | 12/2011 | Engbrecht et al. |
| 8,100,226 B2 | 1/2012 | Cao et al. |
| 8,197,952 B2 | 6/2012 | Yu et al. |
| 8,257,489 B2 | 9/2012 | Yu et al. |
| 8,262,820 B2 | 9/2012 | Yu et al. |
| 8,287,962 B2 | 10/2012 | Reagan et al. |
| 8,323,785 B2 | 12/2012 | Yu et al. |
| RE44,070 E | 3/2013 | Yu et al. |
| 8,470,461 B2 | 6/2013 | Yu et al. |
| 8,475,762 B2 | 7/2013 | Li et al. |
| 8,882,943 B2 | 11/2014 | College et al. |
| 9,540,810 B2 | 1/2017 | Sang et al. |
| 9,828,441 B2 | 11/2017 | Sang et al. |
| 10,464,847 B2 | 11/2019 | Sang et al. |
| 2002/0139082 A1 | 10/2002 | Deford et al. |
| 2002/0152931 A1 | 10/2002 | Chienkuo |
| 2003/0049450 A1 | 3/2003 | Song et al. |
| 2003/0141637 A1 | 7/2003 | Kesselmans et al. |
| 2004/0026002 A1 | 2/2004 | Weldon et al. |
| 2004/0231916 A1 | 11/2004 | Englert et al. |
| 2005/0005928 A1 | 1/2005 | Klingler et al. |
| 2005/0126437 A1 | 6/2005 | Tagge et al. |
| 2005/0223949 A1 | 10/2005 | Bailey, Jr. et al. |
| 2005/0225003 A1 | 10/2005 | Holderbaum et al. |
| 2006/0278132 A1 | 12/2006 | Yu et al. |
| 2006/0278133 A1 | 12/2006 | Yu et al. |
| 2007/0048490 A1 | 3/2007 | Yu et al. |
| 2007/0048549 A1 | 3/2007 | Song et al. |
| 2007/0055058 A1 | 3/2007 | Berckmans et al. |
| 2007/0059513 A1 | 3/2007 | Yu et al. |
| 2007/0102237 A1 | 5/2007 | Baig |
| 2007/0251628 A1 | 11/2007 | Yu et al. |
| 2008/0000392 A1 | 1/2008 | Blackburn et al. |
| 2008/0069762 A1 | 3/2008 | Lynn et al. |
| 2008/0070026 A1* | 3/2008 | Yu ................... B32B 13/08 428/312.4 |
| 2008/0090068 A1 | 4/2008 | Yu |
| 2008/0202415 A1 | 8/2008 | Miller et al. |
| 2008/0305252 A1 | 12/2008 | Cimaglio et al. |
| 2009/0142817 A1 | 6/2009 | Norman et al. |
| 2009/0173775 A1 | 7/2009 | Swoboda et al. |
| 2009/0239977 A1 | 9/2009 | Dubey et al. |
| 2009/0252941 A1 | 10/2009 | Mueller et al. |
| 2009/0253323 A1 | 10/2009 | Mueller et al. |
| 2010/0075166 A1 | 3/2010 | Gilley |
| 2010/0075167 A1 | 3/2010 | Gilley et al. |
| 2010/0139528 A1 | 6/2010 | Yu et al. |
| 2010/0221402 A1 | 9/2010 | Wang et al. |
| 2010/0229714 A1 | 9/2010 | Tonyan et al. |
| 2010/0239886 A1 | 9/2010 | Yu et al. |
| 2010/0247937 A1 | 9/2010 | Liu et al. |
| 2010/0320029 A1 | 12/2010 | Cao et al. |
| 2011/0054053 A1 | 3/2011 | Lee et al. |
| 2011/0100844 A1 | 5/2011 | Cimaglio et al. |
| 2011/0147119 A1 | 6/2011 | Cao et al. |
| 2011/0195241 A1 | 8/2011 | Yu et al. |
| 2012/0024625 A1 | 2/2012 | Cao et al. |
| 2012/0168527 A1 | 7/2012 | Li et al. |
| 2012/0170403 A1 | 7/2012 | Li et al. |
| 2012/0214887 A1 | 8/2012 | Stav et al. |
| 2012/0219785 A1 | 8/2012 | Yu et al. |
| 2012/0251813 A1 | 10/2012 | Yu et al. |
| 2012/0308463 A1 | 12/2012 | Li et al. |
| 2013/0023612 A1 | 1/2013 | Lu et al. |
| 2013/0068364 A1 | 3/2013 | Yu et al. |
| 2013/0098268 A1 | 4/2013 | Li et al. |
| 2013/0099027 A1 | 4/2013 | Li et al. |
| 2013/0099418 A1 | 4/2013 | Li et al. |
| 2013/0100759 A1 | 4/2013 | Wittbold et al. |
| 2013/0101838 A1 | 4/2013 | Yu et al. |
| 2013/0216717 A1 | 8/2013 | Rago et al. |
| 2013/0216762 A1 | 8/2013 | Chan et al. |
| 2013/0225803 A1 | 8/2013 | Hong et al. |
| 2013/0248078 A1 | 9/2013 | Yu et al. |
| 2014/0113124 A1 | 4/2014 | Sang et al. |
| 2014/0113128 A1 | 4/2014 | Sang et al. |
| 2014/0315008 A1 | 10/2014 | Francis |
| 2015/0010767 A1 | 1/2015 | Sang et al. |
| 2015/0175482 A1 | 6/2015 | Stav et al. |

FOREIGN PATENT DOCUMENTS

| | | |
|---|---|---|
| CA | 2816891 | 12/2006 |
| CN | 1300309 | 6/2001 |
| CN | 101203345 | 6/2008 |
| CN | 101456915 | 6/2009 |
| CN | 102007255 | 4/2011 |
| CN | 103819748 | 5/2014 |
| EP | 10148067 | 10/2001 |
| FR | 2220639 | 10/1974 |
| FR | 2376161 | 7/1978 |
| GB | 1008042 | 11/1963 |

(56) References Cited

FOREIGN PATENT DOCUMENTS

| | | |
|---|---|---|
| GB | 1028890 | 5/1966 |
| GB | 1561232 | 2/1980 |
| JP | S50-18642 | 2/1975 |
| JP | 61-047162 | 3/1986 |
| JP | S63-221102 | 9/1988 |
| JP | 01-287101 | 11/1989 |
| JP | 2004501212 | 1/2004 |
| JP | 2010/179268 | 8/2010 |
| JP | 2010540400 | 12/2010 |
| RU | 95108945 | 3/1997 |
| RU | 2315811 | 1/2008 |
| RU | 2390528 | 5/2010 |
| SU | 1405706 | 6/1988 |
| TW | 200922775 | 6/2009 |
| TW | 201332933 | 8/2013 |
| WO | 93/08014 | 4/1993 |
| WO | 2001/19404 | 3/2001 |
| WO | 2001/081263 | 11/2001 |
| WO | 2002/012141 | 2/2002 |
| WO | 2002/031287 | 4/2002 |
| WO | 2005/060628 | 7/2005 |
| WO | 2006/135707 | 12/2006 |
| WO | 2009/129051 | 10/2009 |
| WO | 2011/020528 | 2/2011 |
| WO | 2012091298 | 7/2012 |
| WO | 2012/122102 | 9/2012 |
| WO | 2013/174951 | 11/2013 |
| WO | 2015/050804 | 4/2015 |

OTHER PUBLICATIONS

Examination Report No. 2 for Australian Application No. 2013335106 dated Dec. 7, 2017. (4 pages).
Examination Report No. 1 for Australian Application No. 2014329817 dated Dec. 7, 2017. (5 pages).
Examination Report for European Application No. 13783185.5 dated Feb. 25, 2019. (10 pages).
Examination Report for European Application No. 14789654.2 dated Feb. 21, 2020 (5 pages).
First Office Action for Japanese Application No. 2015-537757 dated Jul. 11, 2017. (4 pages, English summary attached).
Second Office Action for Japanese Application No. 2015-537757 dated Jan. 9, 2018. (5 pages, English summary attached).
First Office Action for Japanese Application No. 2016-518449 dated Oct. 9, 2018. (5 pages, English summary attached).
Brabender, "Viscograph-E—The standard for measurement of starch," Company pamphlet (2009).
Burrows, "A Decade's Experience of Gypsum Board Weight Reduction in the U.S.", 14. Internationale Baustofftagung 1.0197-1.0207 (Weimar, Sep. 20-23, 2000).
Chiu et al., "Modification of Starches," Starch: Chemistry and Technology, Third Edition, Elsevier Inc., 629-655 (2009).
De Mesa, N.J.E. et al., Soy protein-fortified expanded extrudates: Baseline study usinq normal corn starch, Journal of Food Enqineerinq (2008).
Global Gypsum Magazine, "Gypsum Process Engineering Industrial and Thermal Equipment" 7 pages (Nov. 2012).
Hunt et al., "Physicochemical Studies of the Acid Hydrolysis of Corn Starch" 41: 375-385 (Sep. 1964).
Industrial Starch Chemistry Agro by Nature Bulletin, 1-56 (Nov. 2007).
International Search Report and Written Opinion from International Application No. PCT/US1 4/057980 dated Feb. 2, 2015.
International Search Report and Written Opinion from International Application No. PCT/US1 6/038714 dated Feb. 21, 2017.
International Search Report and Written Opinion from International Application No. PCT/US13/64776 dated Jan. 3, 2014.
George Koutlakis, ADM Ogilvie: Starch in General and Starch in Gypsum Board.
Lee et al., "Effects of Gelatinization and Moisture Content of Extruded Starch Pellets on Morphology and Physical Properties of Microwave—Expanded Products" Cereal Chem. 77(6): 769-773 (2000).
Leszek Moscicki, Extrusion—Cooking Techniques, 2011, pp. 215, Wiley-VCH, Poland.
Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, pp. 9-1-9-16 (May 2000).
Rogers et al., "Starch refining and modification applications," The RVA Handbook, Crosbie G.B., Ross A.S. eds. AACC—International Press, 63-74 (2007).
Statement of Grounds and Particulars in Support of Opposition in the Matter of Patent Application No. 2013335106 in the name of United States Gypsum Company and Opposition thereto by CSR Building Products Limited filed by Griffith Hack on Sep. 7, 2018 with IP Australia for Australian Patent Application No. 2013-335106 (16 Paqes).
Sucech, Steven Statutory Declaration in the Matter of Patent Application No. 2013335106; by United States Gypsum Company and in the Matter of an Opposition thereto by CSR Building Products Limited filed by Griffith Hack on Dec. 20, 2018 with IP Australia for Australian Patent Application No. 2013-335106 (40 Paqes).
TA Instruments Product Brochure, The Discovery Hybrid Rheometer (2016).
Whalen, "Extended Products and Degree of Cook," The RVA Handbook, Crosbie G.B., Ross A.S. eds. AACC—International Press, 75-83 (2007).
Zhang, Yousang, "Handbook of Production and Application of Modified Starch," China Light Industry Press, 1999, pp. 16-18, with English Summary.
U.S. Appl. No. 13/835,002, filed Mar. 15, 2013, Patented, U.S. Pat. No. 10,399,899.

* cited by examiner

PREGELATINIZED STARCH WITH MID-RANGE VISCOSITY, AND PRODUCT, SLURRY AND METHODS RELATED THERETO

CROSS-REFERENCE TO RELATED APPLICATION

This patent application is a continuation of U.S. patent application Ser. No. 13/835,002, filed Mar. 15, 2013, which claims the benefit of U.S. Provisional Patent Application No. 61/717,588, filed Oct. 23, 2012, the disclosures of which are incorporated in their entireties by reference for all purposes.

BACKGROUND OF THE INVENTION

Set gypsum (i.e., calcium sulfate dihydrate) is a well-known material that is used in many products, including panels and other products for building construction and remodeling. One such panel (often referred to as gypsum board) is in the form of a set gypsum core sandwiched between two cover sheets (e.g., paper-faced board) and is commonly used in drywall construction of interior walls and ceilings of buildings. One or more dense layers, often referred to as "skim coats" may be included on either side of the core, usually at the paper-core interface.

During manufacture of the board, stucco (i.e., calcined gypsum in the form of calcium sulfate hemihydrate and/or calcium sulfate anhydrite), water, and other ingredients as appropriate are mixed, typically in a pin mixer as the term is used in the art. A slurry is formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of, e.g., a forming plate or the like. The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of the interlocking matrix of set gypsum crystals, thereby imparting strength to the gypsum structure in the product. Heat is required (e.g., in a kiln) to drive off the remaining free (i.e., unreacted) water to yield a dry product.

The excess water that is driven off represents an inefficiency in the system. Energy input is required to remove the water, and the manufacturing process is slowed to accommodate the drying step. However, reducing the amount of water in the system has proven to be very difficult without compromising other critical aspects of commercial product, including board weight and strength.

It will be appreciated that this background description has been created by the inventors to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

BRIEF SUMMARY OF THE INVENTION

In one aspect, the present invention provides board comprising set gypsum core. The core can comprise an interlocking crystal matrix of the gypsum. The board can be disposed between two cover sheets (e.g., formed from paper). The set gypsum core is formed from a slurry comprising water, stucco, and at least one pregelatinized starch characterized as having a "mid-range" viscosity (i.e., having a viscosity from about 20 centipoise to about 700 centipoise) when the starch is subjected to conditions according to the VMA method, as set forth in Example 1 below, with the starch in water in an amount of 15% by weight of the total weight of the starch and water. Thus, the VMA method is used to determine whether the starch exhibits the mid-range viscosity characteristic when subjected to the conditions of the VMA method. This does not mean that the starch must be added to the gypsum slurry under these conditions. Rather, when adding the starch to the slurry, it can be in wet (in various concentrations of starch in the water) or dry forms, and it need not be fully gelatinized or otherwise under the conditions set forth in the VMA method, in accordance with embodiments of the invention. As used herein, "pregelatinized" means any degree of gelatinization.

In another aspect, the present invention provides slurry comprising water, stucco, and at least one pregelatinized starch having the mid-range viscosity from about 20 centipoise to about 700 centipoise wherein the viscosity is measured according to the VMA method. The slurry is sometimes referred to as "gypsum slurry" since gypsum forms therein as water reacts with stucco. As the stucco in the slurry reacts with water, gypsum, i.e., calcium sulfate dihydrate, starts to form. The slurry can be used to make board as well as other gypsum products.

In another aspect, the present invention provides method of making board. Water, stucco, and at least one pregelatinized starch characterized by mid-range viscosity according to the VMA method are mixed to form a slurry. The starch can be added in wet or dry form. The pregelatinized starch need not be fully gelatinized when added to the slurry and need not be under the conditions set forth in the VMA method. The slurry is disposed between a first cover sheet and a second cover sheet to form a wet assembly that is a panel precursor. In this respect, as used herein "disposed between" will be understood to mean that skim coat can be optionally applied or included between the core and one or both cover sheets such that it will be understood that a cover sheet can include skim coat. The panel is cut to form a board. The board is dried. After drying, final dimensioning (e.g., cutting) and processing can take place, as desired. The starch can be chemically modified (in any order relative to a pregelatinization step) in accordance with some embodiments prior to inclusion in the slurry. In some embodiments, the pregelatinized starch is partially gelatinized when added to the slurry, with the remaining gelatinization taking place in the drying step (e.g., in a kiln). The starch becomes fully gelatinized in the kiln in some embodiments.

In another aspect, joint compound comprises calcium carbonate and at least one pregelatinized starch, wherein the starch has a viscosity from about 20 centipoise to about 700 centipoise, and wherein the viscosity is measured according to the VMA method. In some embodiments, the joint compound further comprises calcined gypsum, water and/or set retarder.

In another aspect, acoustical panel comprises an acoustical component comprising fiber and at least one pregelatinized starch, wherein the starch has a viscosity from about 20 centipoise to about 700 centipoise, wherein the viscosity is measured according to the VMA method, and wherein the panel has a Noise Reduction Coefficient of at least about 0.5 according to ASTM C 423-02. In some embodiments, the fibers comprise mineral wool.

DETAILED DESCRIPTION OF THE INVENTION

Embodiments of the present invention are premised, at least in part, on including in a gypsum slurry a pregelatinized starch characterized as having "mid-range" viscosity (e.g., from about 20 centipoise to about 700 centipoise). Although the viscosity characteristic is determined as the starch is placed under certain conditions according to the VMA methodology described herein, it will be understood that the pregelatinized starch need not be added to the slurry under these conditions. Surprisingly and unexpectedly, it has been found that the inclusion of the pregelatinized starch of mid-range viscosity confers a combination of significant benefits such as with respect to starch efficiency (e.g., so that less starch can be used), product strength enhancements, and water demand, e.g., in unison in some embodiments. In accordance with embodiments of the invention, the benefits including with respect to starch efficiency, water demand, and/or strength represent a considerable improvement and advancement over the starches known to used in gypsum slurries, such as non-gelatinized starches (uncooked) or pregelatinized starches (cooked) having viscosity below 20 centipoise, or above 700 centipoise, as measured according to the VMA method. These discoveries impart considerable advantages, including, but not limited to, reducing cost of raw material, enhancing manufacturing efficiency, and enhancing product strength, e.g., allowing for lower weight product with sufficient strength properties.

Starches are classified as carbohydrates and contain two types of polysaccharides, namely linear amylose, and branched amylopectin. Starch granules are semi-crystalline, e.g., as seen under polarized light, and are insoluble at room temperatures. Gelatinization is the process in which the starch is placed in water and heated ("cooked") such that the crystalline structure of the starch granules is melted and the starch molecules dissolve in water such that a good dispersion results. It has been found that, when transforming a starch granule to gelatinized form, initially the starch granule provides little viscosity in water because starch granules are water insoluble. As the temperature increases, the starch granule swells and the crystalline structure melts at the gelatinization temperature. The peak viscosity is when the starch granule has maximum swelling. Further heating will break the starch granules and dissolve the starch molecules in water, with a precipitous dropoff in viscosity. After cooling, the starch molecule will reassociate to form a 3-D gel structure, with the viscosity increasing due to the gel structure. See, e.g., FIG. 1, discussed herein below. Some commercial starches are sold in a pregelatinized form, while others are sold in the granular form. In accordance with some embodiments of the present invention, the commercial granular form undergoes at least some degree of gelatinization so that it is pregelatinized prior to addition to gypsum slurry (typically in a mixer, e.g., pin mixer).

To achieve the desired mid-range viscosities according to embodiments of the invention, the starch molecule can be modified, e.g., to hydrolyze glycosidic bonds between glucose units to achieve desired molecular weight. For example, such modifications can include acid modifications, enzyme modifications, and/or other methods. For example, other approaches for achieving low viscosity include, for example, mechanical energy-extrusion or modification of the starch molecule to include more linear amylose units. As an example, in the case of Tackidex K720, low viscosity is achieved by mechanical energy extrusion, more amylose units (~35%), and hydroxypropylation. The modification can take place before or after gelatinization takes place. In the case of enzyme modifications, it is generally preferred that the modification take place after the gelatinization step. The most commonly used starch converting enzyme is α-amylase (alpha-amylase). The enzyme hydrolysis reaction can be stopped either by adjusting the pH or by heating. In the case of acid modifications, it is generally preferred that the modification take place before gelatinization because it tends to be more efficient and less cost intensive. To prepare acid-modified starches, it will be appreciated that aqueous suspension of unmodified starch can be treated with, e.g., a small quantity of a strong acid such as hydrochloric acid, sulfuric acid, nitric acid, hydrofluoric acid, or the like. By adjusting reaction time, the degree of depolymerization can be modified. For example, when the proper fluidity is achieved, e.g., as determined by in-process laboratory controls, mild alkali is introduced to neutralize the acid and stop hydrolysis. Thus, acid-modified starches can be prepared in various fluidities. Also, acid-modified starches may be used directly after neutralization without further purification or may be purified to remove salts. The end use of the acid-modified starch may determine the desirability of purification. For example, a composition of starch modified by sulfuric acid and neutralized by calcium hydroxide may contain sulfate and calcium ions which could be added to a stucco and water slurry. Since the stucco has sulfate and calcium ions already, it may not be necessary to purify the sulfuric acid-modified starch prior to addition to the slurry. Thus, considerations to determine the desirability of purification include, for example, the identity of the acid and alkali base and whether it is desirable to add other ions besides sulfate or calcium ions to the slurry.

Pregelatinized starches exhibiting the mid-range viscosity characteristic according to the invention provide significant benefits to the strength of the product (e.g., wallboard). Since starch contains glucose monomers containing three hydroxy groups, starch provides many sites for hydrogen bonding to gypsum crystals. While not wishing to be bound by any particular theory, it is believed that the molecular size of pregelatinized starch that exhibit the mid-range viscosity characteristic allows for optimal mobility of starch molecules to align starch molecules with the gypsum crystals to facilitate good binding of starch to gypsum crystals to strengthen the resulting crystalline gypsum matrix, e.g., via hydrogen bonding. Pregelatinized starches having viscosities outside the mid-range, which would have either longer chain lengths and higher molecular weight (viscosity that is too high) and shorter chain lengths and lower molecular weights (viscosity that is too low), respectively, do not provide the same combination of benefits. It is also believed that, with respect to starch efficiency, when the starch molecules sufficiently bind to the gypsum crystals, additional starch does not add significant benefit because the crystals are already bound such that there is no further gypsum crystal sites for which the starch to adhere or bind.

Accordingly, because of the optimal binding between gypsum crystals and the pregelatinized starch molecules of mid-range viscosity, in effect the strength of the crystalline gypsum matrix is enhanced, and less starch is required to promote that strength compared with conventional starches.

Pregelatinized starch exhibiting the mid-range viscosity characteristic also provides advantages with respect to water demand. Adding starch to gypsum slurry requires that additional water be added to the gypsum slurry in order to maintain a desired degree of slurry fluidity. This is because starch increases the viscosity and reduces the fluidity of the gypsum slurry. Thus, the use of starch in conventional systems has resulted in an increase in water demand such that even more excess water would be required in the gypsum slurry. Surprisingly and unexpectedly, pregelatinized starch having the mid-range viscosity characteristic according to the present invention demands less water so that the effect on water demand in the gypsum slurry is reduced, especially in comparison to conventional starches. Furthermore, because of the efficiency of the inventive pregelatinized starch having the mid-range viscosity characteristic, such that less starch can be used, the positive impact on water demand can be even more significant in accordance with some embodiments of the invention. This lower water demand provides considerable efficiencies during manufacture. For example, excess water requires energy input for drying. The speed of the line must be slowed to accommodate the drying. Thus, by reducing the water load in the gypsum slurry, less energy resources and cost can be seen, as well as faster production rates. In some embodiments, the increase in water demand in a gypsum slurry is less than the increase in water demand required by other starches such as pregelatinized starches having viscosity above 700 centipoise (e.g., about 773 centipoise).

Any suitable starch can be selected so long as it can meet the mid-range viscosity characteristic of the invention, e.g., via modification or otherwise. As used herein, "starch" refers to a composition that includes a starch component. As such, the starch can be 100% pure starch or may have other components such as those commonly found in flours such as protein and fiber, so long as the starch component makes up at least about 75% by weight of the starch composition. The starch can be in the form of a flour (e.g., corn flour) containing starch, such as flour having at least about 75% starch by weight of the flour, e.g., at least about 80%, at least about 85%, at least about 90%, at least about 95%, etc.). By way of example, and not in any limitation, the starch can be in the form of a corn flour containing starch; corn starch, such as, for example, Clinton® 260 (ADM), Supercore® S23F (GPC), Amidon M-B 065R (Roquette); a pea starch, such as, for example, acid modified acetylated starch such as Clearam LG 7015 (Roquette); alkylated starch such as hydroxyethylated starch, such as, for example, Clineo® 714 (ADM), Coatmaster® K57F (GPC), or hydroxypropylated starch, such as, for example Tackidex® K720 (Roquette); as well as oxidized starch, such as Clinton® 444 (ADM); or any combination thereof.

Gypsum slurry is normally formed inside a pin mixer. However, the mode of introduction of ingredients into the mixer may vary. For example, various combinations of components may be pre-mixed before entering the mixer, e.g., one or more dry ingredients and/or one or more wet ingredients may be pre-mixed. By "added to the slurry," as used herein, it will be understood that ingredients may be pre-mixed in any suitable manner prior to entry into the mixer where the slurry is formed as set forth herein.

The pregelatinized starch having the mid-range viscosity characteristic of the invention can be included in the gypsum slurry in a wet or dry form. If in a wet form, the starch can be included in any suitable concentration, and could be pre-mixed with other wet ingredients. While the viscosity is measured according to the VMA method set forth in Example 1 while in water in an amount of 15% starch by weight of the total weight of starch and water, this does not necessarily mean that the starch added to the slurry is fully gelatinized or otherwise under the conditions outlined in the VMA method, or that it must be in a 15% solution in accordance with embodiments the present invention. Rather, the viscosity feature of the starch is characterized under these particular conditions to determine whether the starch meets the viscosity criterion of embodiments of the invention and to allow comparison of the viscosity characteristic of different starches under normalized circumstance.

Thus, as used herein, "pregelatinized" means that the starch has any degree of gelatinization before included in the gypsum slurry. In some embodiments, the pregelatinized starch can be partially gelatinized when included in the slurry, but becomes fully gelatinized when exposed to elevated temperature, e.g., in the kiln for the drying step to remove excess water. In some embodiments, the pregelatinized starch is not fully gelatinized, even upon exiting the kiln so long as the starch meets the mid-range viscosity characteristic when under the conditions according to the VMA method.

Viscograph and differential scanning calorimetry (DSC) are two different methods to describe starch gelatinization. Degree of starch gelatinization can be determined by, for example, thermogram from DSC, e.g., using peak area (melting of crystal) for calculation. A viscogram (from viscograph) is less desirable to determine degree of partial gelatinization but is a good tool to obtain data such as the viscosity change of starch, gelatinization maximum, gelatinization temperature, gelification, viscosity during holding, viscosity at the end of cooling, etc. For degree of gelatinization, the DSC measurements are done in the presence of excess water, particularly at or above 67% by weight. If water content of starch/water mixture is less than 67%, gelatinization temperature will increase as water content decreases. It is difficult to melt starch crystals when available water is limited. When water content of starch/water mixture reaches 67%, gelatinization temperature will keep constant no matter how much more water is added into the starch/water mixture. Gelatinization onset temperature indicates the starting temperature of gelatinization. Gelatinization end temperature indicates the end temperature of gelatinization. Enthalpy of gelatinization represents the amount of crystalline structure melted during gelatinization. By using the enthalpy from a starch DSC thermogram, the degree of gelatinization can be indicated.

Different starches have different gelatinization onset temperature, end temperatures, and gelatinization enthalpy. Therefore, different starches may become fully gelatinized at different temperatures. It will be understood that a starch is fully gelatinized when starch is heated beyond the end temperature of gelatinization in excess water. In addition, for any particular starch, if the starch is heated below the end temperature of gelatinization, the starch will be partially gelatinized. Thus, partial and not full gelatinization will occur when starch in the presence of excess water is heated below gelatinization end temperature, e.g., as determined by DSC. Full gelatinization will occur when starch in the presence of excess water is heated above gelatinization end temperature, e.g., as determined by DSC. The degree of gelatinization can be adjusted in different ways, such as, for example, by heating the starch below the gelatinization end temperature to form partial gelatinization. For example, if the enthalpy for fully gelatinizing a starch is 4 J/g, when the DSC shows the gelatinization enthalpy of the starch as being only 2 J/g, this means 50% of the starch has been gelatinized. Fully gelatinized starch would not have the DSC thermogram gelatinization peak (enthalpy=0 J/g) when it is measured by DSC.

As noted, the degree of gelatinization can be any suitable amount, such as about 50% or more, etc. However, smaller degrees of gelatinization will more closely approximate granular starch and may not take full advantage of the strength enhancement, better (more complete) dispersion, and/or water demand reduction of some embodiments of the invention. Thus, in some embodiments, it is preferred that there is a higher degree of gelatinization, e.g., at least about 60%, at least about 70%, at least about 80%, at least about 90%, at least about 95%, at least about 97%, at least about 99%, or full (100%) gelatinization. Starch with lower degree of gelatinization can be added to slurry with additional gelatinization (e.g., to 100%) taking place in the kiln. For purposes of addition to slurry, by "fully gelatinized," it will be understood that the starch is sufficiently cooked at or above its gelatinization temperature or to otherwise achieve full gelatinization as can be seen from DSC techniques. Although some small degree of retrogradation upon cooling may be expected, the starch still will be understood as "fully gelatinized" for addition to gypsum slurry in some embodiments as one of ordinary skill in the art will recognize. In contrast, for purposes of the VMA method discussed herein, such retrogradation is not accepted in making the viscosity measurement.

In some embodiments, the mid-range viscosity of the pregelatinized starch can be from about 20 centipoise to about 700 centipoise, such as from about 20 centipoise to about 500 centipoise, or from about 30 centipoise to about 200 centipoise. In embodiments of the invention, the viscosity of the pregelatinized starch when tested under the VMA method can be, e.g., as listed in Tables 1A, 1B and 1C below. In the tables, an "X" represents the range "from about [corresponding value in top row] to about [corresponding value in left-most column]." The indicated values represent viscosity of the pregelatinized starch in centipoise. For ease of presentation, it will be understood that each value represents "about" that value. For example, the first "X" in Table 1A is the range "about 20 centipoise to about 25 centipoise."

TABLE 1A

|  | 20 | 25 | 30 | 35 | 40 | 45 | 50 | 55 | 60 | 65 | 70 | 75 |
|---|---|---|---|---|---|---|---|---|---|---|---|---|
| 25 | X | | | | | | | | | | | |
| 30 | X | X | | | | | | | | | | |
| 35 | X | X | X | | | | | | | | | |
| 40 | X | X | X | X | | | | | | | | |
| 45 | X | X | X | X | X | | | | | | | |
| 50 | X | X | X | X | X | X | | | | | | |
| 55 | X | X | X | X | X | X | X | | | | | |
| 60 | X | X | X | X | X | X | X | X | | | | |
| 65 | X | X | X | X | X | X | X | X | X | | | |
| 70 | X | X | X | X | X | X | X | X | X | X | | |
| 75 | X | X | X | X | X | X | X | X | X | X | X | |
| 100 | X | X | X | X | X | X | X | X | X | X | X | X |
| 125 | X | X | X | X | X | X | X | X | X | X | X | X |
| 150 | X | X | X | X | X | X | X | X | X | X | X | X |
| 175 | X | X | X | X | X | X | X | X | X | X | X | X |
| 200 | X | X | X | X | X | X | X | X | X | X | X | X |
| 225 | X | X | X | X | X | X | X | X | X | X | X | X |
| 250 | X | X | X | X | X | X | X | X | X | X | X | X |

TABLE 1A-continued

|  | 20 | 25 | 30 | 35 | 40 | 45 | 50 | 55 | 60 | 65 | 70 | 75 |
|---|---|---|---|---|---|---|---|---|---|---|---|---|
| 275 | X | X | X | X | X | X | X | X | X | X | X | X |
| 300 | X | X | X | X | X | X | X | X | X | X | X | X |
| 325 | X | X | X | X | X | X | X | X | X | X | X | X |
| 350 | X | X | X | X | X | X | X | X | X | X | X | X |
| 375 | X | X | X | X | X | X | X | X | X | X | X | X |
| 400 | X | X | X | X | X | X | X | X | X | X | X | X |
| 425 | X | X | X | X | X | X | X | X | X | X | X | X |
| 450 | X | X | X | X | X | X | X | X | X | X | X | X |
| 475 | X | X | X | X | X | X | X | X | X | X | X | X |
| 500 | X | X | X | X | X | X | X | X | X | X | X | X |
| 525 | X | X | X | X | X | X | X | X | X | X | X | X |
| 550 | X | X | X | X | X | X | X | X | X | X | X | X |
| 575 | X | X | X | X | X | X | X | X | X | X | X | X |
| 600 | X | X | X | X | X | X | X | X | X | X | X | X |
| 625 | X | X | X | X | X | X | X | X | X | X | X | X |
| 650 | X | X | X | X | X | X | X | X | X | X | X | X |
| 675 | X | X | X | X | X | X | X | X | X | X | X | X |
| 700 | X | X | X | X | X | X | X | X | X | X | X | X |

TABLE 1B

|  | 100 | 125 | 150 | 175 | 200 | 225 | 250 | 275 | 300 | 325 | 350 | 375 |
|---|---|---|---|---|---|---|---|---|---|---|---|---|
| 125 | X | | | | | | | | | | | |
| 150 | X | X | | | | | | | | | | |
| 175 | X | X | X | | | | | | | | | |
| 200 | X | X | X | X | | | | | | | | |
| 225 | X | X | X | X | X | | | | | | | |
| 250 | X | X | X | X | X | X | | | | | | |
| 275 | X | X | X | X | X | X | X | | | | | |
| 300 | X | X | X | X | X | X | X | X | | | | |
| 325 | X | X | X | X | X | X | X | X | X | | | |
| 350 | X | X | X | X | X | X | X | X | X | X | | |
| 375 | X | X | X | X | X | X | X | X | X | X | X | |
| 400 | X | X | X | X | X | X | X | X | X | X | X | X |
| 425 | X | X | X | X | X | X | X | X | X | X | X | X |
| 450 | X | X | X | X | X | X | X | X | X | X | X | X |
| 475 | X | X | X | X | X | X | X | X | X | X | X | X |
| 500 | X | X | X | X | X | X | X | X | X | X | X | X |
| 525 | X | X | X | X | X | X | X | X | X | X | X | X |
| 550 | X | X | X | X | X | X | X | X | X | X | X | X |
| 575 | X | X | X | X | X | X | X | X | X | X | X | X |
| 600 | X | X | X | X | X | X | X | X | X | X | X | X |
| 625 | X | X | X | X | X | X | X | X | X | X | X | X |
| 650 | X | X | X | X | X | X | X | X | X | X | X | X |
| 675 | X | X | X | X | X | X | X | X | X | X | X | X |
| 700 | X | X | X | X | X | X | X | X | X | X | X | X |

TABLE 1C

|  | 400 | 425 | 450 | 475 | 500 | 525 | 550 | 575 | 600 | 625 | 650 | 675 |
|---|---|---|---|---|---|---|---|---|---|---|---|---|
| 425 | X | | | | | | | | | | | |
| 450 | X | X | | | | | | | | | | |
| 475 | X | X | X | | | | | | | | | |
| 500 | X | X | X | X | | | | | | | | |
| 525 | X | X | X | X | X | | | | | | | |
| 550 | X | X | X | X | X | X | | | | | | |
| 575 | X | X | X | X | X | X | X | | | | | |
| 600 | X | X | X | X | X | X | X | X | | | | |
| 625 | X | X | X | X | X | X | X | X | X | | | |
| 650 | X | X | X | X | X | X | X | X | X | X | | |
| 675 | X | X | X | X | X | X | X | X | X | X | X | |
| 700 | X | X | X | X | X | X | X | X | X | X | X | X |

Thus, the viscosity of the pregelatinized starch can have a range between and including any of the aforementioned endpoints set forth in Tables 1A, 1B or 1C.

The pregelatinized starch having the mid-range viscosity characteristic in accordance with embodiments of the present invention surprisingly and unexpectedly can be included in the slurry in a relatively low amount (solids/solids basis)

and still achieve significant strength enhancement in the board. Accordingly, in preferred embodiments of the invention, the pregelatinized starch having the mid-range viscosity characteristic is included in the gypsum slurry in an amount that is about 5% or less by weight of the stucco (e.g., about 0.1% to about 5%) or even less, such as about 3% or less by weight of the stucco. For example, the pregelatinized starch can be included in an amount from about 0.1% to about 4% by weight of the stucco, about 0.1% to about 3%, about 0.1% to about 2%, about 0.1% to about 1.5%, etc. It has been found that increasing the amount of the mid-range viscosity starch in the slurry beyond these ranges does not improve strength as efficiently since strength levels can somewhat plateau upon addition of even more starch in some embodiments. However, higher starch quantities can be utilized if desired especially where the diminishing return on strength is accepted. For example, while not preferred, in some embodiments, starch amounts greater than about 5% can be used, e.g., from about 0.1% to about 10% by weight of the stucco.

In embodiments of the invention, the amount of pregelatinized starch can be, for example, as listed in Tables 2A and 2B below. In the table, an "X" represents the range "from about [corresponding value in top row] to about [corresponding value in left-most column]." The indicated values represent the amount of starch as a percentage by weight of the stucco. For ease of presentation, it will be understood that each value represents "about" that value. For example, the first "X" is the range "from about 0.1% of the starch by weight of the stucco, to about 0.25% of the starch by weight of the stucco."

TABLE 2A

| | 0.1 | 0.25 | 0.5 | 0.75 | 1.0 | 1.25 | 1.5 | 1.75 | 2.0 | 2.25 | 2.5 | 2.75 | 3.0 | 3.5 |
|---|---|---|---|---|---|---|---|---|---|---|---|---|---|---|
| 0.25 | X | | | | | | | | | | | | | |
| 0.5 | X | X | | | | | | | | | | | | |
| 0.75 | X | X | X | | | | | | | | | | | |
| 1.0 | X | X | X | X | | | | | | | | | | |
| 1.25 | X | X | X | X | X | | | | | | | | | |
| 1.5 | X | X | X | X | X | X | | | | | | | | |
| 1.75 | X | X | X | X | X | X | X | | | | | | | |
| 2.0 | X | X | X | X | X | X | X | X | | | | | | |
| 2.25 | X | X | X | X | X | X | X | X | X | | | | | |
| 2.5 | X | X | X | X | X | X | X | X | X | X | | | | |
| 2.75 | X | X | X | X | X | X | X | X | X | X | X | | | |
| 3.0 | X | X | X | X | X | X | X | X | X | X | X | X | | |
| 3.5 | X | X | X | X | X | X | X | X | X | X | X | X | X | |
| 4.0 | X | X | X | X | X | X | X | X | X | X | X | X | X | X |
| 4.5 | X | X | X | X | X | X | X | X | X | X | X | X | X | X |
| 5.0 | X | X | X | X | X | X | X | X | X | X | X | X | X | X |
| 5.5 | X | X | X | X | X | X | X | X | X | X | X | X | X | X |
| 6.0 | X | X | X | X | X | X | X | X | X | X | X | X | X | X |
| 6.5 | X | X | X | X | X | X | X | X | X | X | X | X | X | X |
| 7.0 | X | X | X | X | X | X | X | X | X | X | X | X | X | X |
| 7.5 | X | X | X | X | X | X | X | X | X | X | X | X | X | X |
| 8.0 | X | X | X | X | X | X | X | X | X | X | X | X | X | X |
| 8.5 | X | X | X | X | X | X | X | X | X | X | X | X | X | X |
| 9.0 | X | X | X | X | X | X | X | X | X | X | X | X | X | X |
| 9.5 | X | X | X | X | X | X | X | X | X | X | X | X | X | X |
| 10.0 | X | X | X | X | X | X | X | X | X | X | X | X | X | X |

TABLE 2B

| | 4.0 | 4.5 | 5.0 | 5.5 | 6.0 | 6.5 | 7.0 | 7.5 | 8.0 | 8.5 | 9.0 | 9.5 |
|---|---|---|---|---|---|---|---|---|---|---|---|---|
| 4.5 | X | | | | | | | | | | | |
| 5.0 | X | X | | | | | | | | | | |
| 5.5 | X | X | X | | | | | | | | | |
| 6.0 | X | X | X | X | | | | | | | | |
| 6.5 | X | X | X | X | X | | | | | | | |
| 7.0 | X | X | X | X | X | X | | | | | | |
| 7.5 | X | X | X | X | X | X | X | | | | | |
| 8.0 | X | X | X | X | X | X | X | X | | | | |
| 8.5 | X | X | X | X | X | X | X | X | X | | | |
| 9.0 | X | X | X | X | X | X | X | X | X | X | | |
| 9.5 | X | X | X | X | X | X | X | X | X | X | X | |
| 10.0 | X | X | X | X | X | X | X | X | X | X | X | X |

Thus, the amount of the pregelatinized starch can have a range between and including any of the aforementioned endpoints set forth in Tables 2A or 2B.

Pregelatinized starches having the desired mid-range viscosity characteristic can be combined with other starches in accordance with embodiments of the invention. For example, the pregelatinized starches exhibiting the desired mid-range viscosity characteristic can be combined with other starches to enhance both core strength and paper-core bond, particularly if some increase in water demand is accepted. Thus, in some embodiments of the invention, gypsum slurry may include one or more pregelatinized starches having the mid-range viscosity characteristic, as well as one or more other types of starches. Other starches can include, for example, pregelatinized starches having viscosity below 20 centipoise and/or above 700 centipoise. One example is pregelatinized corn starch (e.g., having a viscosity over 700 centipoise such as about 773 centipoise). The other starches may also be in the form of, e.g., non-pregelatinized starches, such as acid-modified starches, as well as alkylated starches, e.g., ethylated starches, that are not gelatinized, etc. The combination of starches may be pre-mixed (e.g, in a dry mix, optionally with other components such as stucco, etc., or in a wet mix with other wet ingredients) before addition to the gypsum slurry, or they can be included in the gypsum slurry one at a time, or any variation thereof. Any suitable proportion of pregelatinized starch having the mid-range viscosity characteristic and other starch may be included. For example, the starch content of pregelatinized starch having the mid-range viscosity characteristic as a percentage of total starch content to be added to gypsum slurry can be, e.g., at least about 10% by weight, such as at least about 20%, at least about 30%, at least about 40%, at least about 50%, at least about 60%, at least about 70%, at least about 80%, at least about 90%, at least about 95%, at least about 99%, at least about 100%, or any range in between). In exemplary embodiments, the ratio of pregelatinized starch having the mid-range viscosity characteristic to other starch can be about 25:75, about 30:70, about 35:65, about 50:50, about 65:35, about 70:30, about 75:25, etc.

In addition to the starch component, the slurry is formulated to include water, stucco, foaming agent (sometimes referred to simply as "foam"), and other additives as desired. The stucco can be in the form of calcium sulfate alpha hemihydrate, calcium sulfate beta hemihydrate, and/or calcium sulfate anhydrite. The stucco can be fibrous or non-fibrous. Foaming agent can be included to form an air void distribution within the continuous crystalline matrix of set gypsum. In some embodiments, the foaming agent comprises a major weight portion of unstable component, and a minor weight portion of stable component (e.g., where unstable and blend of stable/unstable are combined). The weight ratio of unstable component to stable component is effective to form an air void distribution within the set gypsum core. See, e.g., U.S. Pat. Nos. 5,643,510; 6,342,284; and 6,632,550. It has been found that suitable void distribution and wall thickness (independently) can be effective to enhance strength, especially in lower density board (e.g., below about 35 pcf). See, e.g., US 2007/0048490 and US 2008/0090068. Evaporative water voids, generally having voids of about 5 μm or less in diameter, also contribute to the total void distribution along with the aforementioned air (foam) voids. In some embodiments, the volume ratio of voids with a pore size greater than about 5 microns to the voids with a pore size of about 5 microns or less, is from about 0.5:1 to about 9:1, such as, for example, about 0.7:1 to about 9:1, about 0.8:1 to about 9:1, about 1.4:1 to about 9:1, about 1.8:1 to about 9:1, about 2.3:1 to about 9:1, about 0.7:1 to about 6:1, about 1.4:1 to about 6:1, about 1.8:1 to about 6:1, about 0.7:1 to about 4:1, about 1.4:1 to about 4:1, about 1.8:1 to about 4:1, about 0.5:1 to about 2.3:1, about 0.7:1 to about 2.3:1, about 0.8:1 to about 2.3:1, about 1.4:1 to about 2.3:1, about 1.8:1 to about 2.3:1, etc. In some embodiments, the foaming agent is present in the slurry, e.g., in an amount of less than about 0.5% by weight of the stucco such as about 0.01% to about 0.5%, about 0.01% to about 0.4%, about 0.01% to about 0.3%, about 0.01% to about 0.2%, about 0.01% to about 0.1%, about 0.02% to about 0.4%, about 0.02% to about 0.3%, about 0.02% to about 0.2%, etc.

Additives such as accelerator (e.g., wet gypsum accelerator, heat resistant accelerator, climate stabilized accelerator) and retarder are well known and can be included. See, e.g., U.S. Pat. Nos. 3,573,947 and 6,409,825. In some embodiments where accelerator and/or retarder are included, the accelerator and/or retarder each can be in the gypsum slurry in an amount on a solid basis of, e.g, from about 0% to about 10% by weight of the stucco (e.g., about 0.1% to about 10%), such as, for example, from about 0% to about 5% by weight of the stucco (e.g., about 0.1% to about 5%). Other additives as desired may be included, e.g., to impart strength to enable lower weight product with sufficient strength, to avoid permanent deformation, to promote green strength, e.g., as the product is setting on the conveyor traveling down a manufacturing line, to promote fire resistance, to promote water resistance, etc.

For example, the slurry can optionally include at least one dispersant to enhance fluidity in some embodiments. Like the starch and other ingredients, the dispersants may be included in a dry form with other dry ingredients and/or in a liquid form with other liquid ingredients in the core slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE111, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosulfonates or sulfonated lignin. Lignosulfonates are water-soluble anionic polyelectrolyte polymers, byproducts from the production of wood pulp using sulfite pulping. One example of a lignin useful in the practice of principles of embodiments of the present invention is Marasperse C-21 available from Reed Lignin Inc.

Lower molecular weight dispersants are generally preferred. Lower molecular weight naphthalenesulfonate dispersants are favored because they trend to a lower water demand than the higher viscosity, higher molecular weight dispersants. Thus, molecular weights from about 3,000 to about 10,000 (e.g., about 8,000 to about 10,000) are preferred. As another illustration, for PCE211 type dispersants, in some embodiments, the molecular weight can be from about 20,000 to about 60,000, which exhibit less retardation than dispersants having molecular weight above 60,000.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from GEO Specialty Chemicals, for example. Another exemplary naphthalenesulfonate is DAXAD, available from Hampshire Chemical Corp.

If included, the dispersant can be included in any suitable (solids/solids) amount, such as, for example, about 0.1% to about 5% by weight of the stucco, e.g., about 0.1% to about 4%, about 0.1% to about 3%, about 0.2% to about 3%, about 0.5% to about 3%, about 0.5% to about 2.5%, about 0.5% to about 2%, about 0.5% to about 1.5%, etc.

One or more phosphate-containing compounds can also be optionally included in the slurry, if desired. For example, phosphate-containing components useful in some embodiments include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate compositions in accordance with some embodiments of the invention can enhance green strength, resistance to permanent deformation (e.g., sag), dimensional stability, etc. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}P_nO_{3n+1}$ wherein n=1000-3000, or polyphosphoric acid having two or more repeating phosphoric acid units and having the molecular formula $H_{n+2}P_nO_{3n+1}$ wherein n is two or more.

The phosphate can be included in a dry form or in a form in water (e.g., a phosphate solution from about 5% to about 20%, such as about a 10% solution). If included, the phosphate can be in any suitable amount (solids/solids basis), such as from about 0.01% to about 0.5% by weight of the stucco, e.g., from about 0.03% to about 0.4%, from about 0.1% to about 0.3%, or from about 0.12% to about 0.4% by weight of the stucco.

Suitable additives for fire-rated and/or water resistant product can also optionally be included, including e.g., siloxanes (water resistance); fiber; heat sink additives such as aluminum trihydrite (ATH), magnesium hydroxide or the like; and/or high expansion particles (e.g., expandable to about 300% or more of original volume when heated for about one hour at 1560° F.). See, e.g., co-pending, commonly assigned U.S. application Ser. No. 13/400,010 (filed Feb. 17, 2012) for description of these and other ingredients. In some embodiments, high expansion vermiculite is included, although other fire resistant materials can be included. The board of some fire-related product according to the invention can have a Thermal Insulation Index (TI) of about 17 minutes or greater, e.g., about 20 minutes or greater, about 30 minutes or greater, about 45 minutes or greater, about 60 minutes or greater, etc.; and/or a High Temperature Shrinkage (at temperatures of about 1560° F. (850° C.)) of less than about 10% in the x-y directions and expansion in the z-direction of greater than about 20%. The fire or water resistance additives can be included in any suitable amount as desired depending, e.g., on fire rating, etc. For example, if included, the fire or water resistance additives can be in an amount from about 0.5% to about 10% by weight of the stucco, such as from about 1% to about 10%, about 1% to about 8%, about 2% to about 10%, about 2% to about 8% by weight of the stucco, etc.

If included, the siloxane preferably is added in the form of an emulsion. The slurry is then shaped and dried under conditions which promote the polymerization of the siloxane to form a highly cross-linked silicone resin. A catalyst which promotes the polymerization of the siloxane to form a highly cross-linked silicone resin can be added to the gypsum slurry. In some embodiments, solventless methyl hydrogen siloxane fluid sold under the name SILRES BS 94 by Wacker-Chemie GmbH (Munich, Germany) can be used as the siloxane. This product is a siloxane fluid containing no water or solvents. It is contemplated that about 0.3% to about 1.0% of the BS 94 siloxane may be used in some embodiments, based on the weight of the dry ingredients.

For example, in some embodiments, it is preferred to use from about 0.4% to about 0.8% of the siloxane based on the dry stucco weight.

The slurry formulation can be made with any suitable water/stucco ratio, e.g., about 0.4 to about 1.3. However, because the pregelatinized starches having the mid-range viscosity characteristic of the invention reduce the amount of water required to be added to the slurry to accommodate them, as compared with other starches, the slurry can be formulated with a water/stucco ratio input that is lower in some embodiments than what is conventional for other starch-containing gypsum slurries, especially at low weight/density. For example, in some embodiments, the water/stucco ratio can be from about 0.4 to about 1.1, about 0.4 to about 0.9, about 0.4 to about 0.85, about 0.45 to about 0.85, about 0.55 to about 0.85, about 0.55 to about 0.8, about 0.6 to about 0.9, about 0.6 to about 0.85, about 0.6 to about 0.8, etc.

The cover sheets can be formed of any suitable material and basis weight. Advantageously, board core formed from slurry comprising pregelatinized starch characterized by mid-range viscosity provides sufficient strength in board even with lower basis weight cover sheets such as, for example, less than 45 lbs/MSF (e.g., about 33 lbs/MSF to 45 lbs/MSF) even for lower weight board (e.g., having a density of about 35 pcf or below) in some embodiments. However, if desired, in some embodiments, heavier basis weights can be used, e.g., to further enhance nail pull resistance or to enhance handling, e.g., to facilitate desirable "feel" characteristics for end-users. In some embodiments, to enhance strength (e.g., nail pull strength), especially for lower density board, one or both of the cover sheets can be formed from paper and have a basis weight of, for example, at least about 45 lbs/MSF (e.g., from about 45 lbs/MSF to about 65 lbs/MSF, about 45 lbs/MSF to about 60 lbs/MSF, about 45 lbs/MSF to about 55 lbs/MSF, about 50 lbs/MSF to about 65 lbs/MSF, about 50 lbs/MSF to about 60 lbs/MSF, etc.). If desired, in some embodiments, one cover sheet (e.g., the "face" paper side when installed) can have aforementioned higher basis weight, e.g., to enhance nail pull resistance and handling, while the other cover sheet (e.g., the "back" sheet when the board is installed) can have somewhat lower weight basis if desired (e.g., weight basis of less than 45 lbs/MSF, e.g., from about 33 lbs/MSF to 45 lbs/MSF (e.g., about 33 lbs/MSF to about 40 lbs/MSF).

Board weight is a function of thickness. Since boards are commonly made at varying thickness, board density is used herein as a measure of board weight. The advantages of the mid-range viscosity starch in accordance with embodiments of the invention can be seen across various board densities, e.g., about 40 pcf or less, such as from about 20 pcf to about 40 pcf, from about 24 pcf to about 37 pcf, etc. However, preferred embodiments of the invention have particular utility at lower densities where the enhanced strength provided by the mid-range viscosity starches of the invention advantageously enable the use of lower weight board with good strength and lower water demand than board made from other starches. For example, in some embodiments, board density can be from about 20 pcf to about 35 pcf, e.g., about 24 pcf to about 35 pcf, about 24 pcf to about 34 pcf, about 27 pcf to about 35 pcf, about 27 pcf to about 34 pcf, about 30 pcf to about 34 pcf, about 27 pcf to about 30 pcf, etc.

The starches having the mid-range viscosity characteristic of the invention provide strength enhancement to product according to the invention, which can be especially beneficial at lower weight/density. For example, in some embodiments, board core or other slurry cast according to the 2 inch cube test (without foam) described herein preferably exhibit a compressive strength of at least about 1900 psi, e.g., at least about 1950 psi, at least about 2000 psi, at least about 2050 psi, at least about 2100 psi, at least about 2150 psi, at least about 2200 psi, at least about 2250 psi, at least about 2300 psi, at least about 2350 psi, etc.

In some embodiments, board according to the invention meets test protocols according to ASTM Standard C473-10. For example, in some embodiments, when the board is cast at a thickness of ½ inch, the board has a nail pull resistance of at least about 65 lb as determined according to ASTM C 473 (e.g., at least about 68 lb, at least about 70 lb, at least about 72 lb, at least about 75 lb, at least about 77 lb, etc). With respect to flexural strength, in some embodiments, when cast in a board of ½ inch thickness, the board has a flexural strength of at least about 36 lb in a machine direction (e.g., at least about 38 lb, at least about 40 lb, etc) and/or at least about 107 lb (e.g., at least about 110 lb, at least about 112 lb, etc) in a cross-machine direction as determined according to the ASTM standard C473. In addition, in some embodiments, board can have an average core hardness of at least about 11 pounds as determined according to ASTM C-473. Due at least in part to the mid-range viscosity characteristic of embodiments of the invention, these standards can be met even with respect to lower density board (e.g., about 35 pcf or less) as described herein.

Product according to embodiments of the invention can be made on typical manufacturing lines. For example, board manufacturing techniques are described in, for example, U.S. Pat. No. 7,364,676 and U.S. Patent Application Publication 2010/0247937. Briefly, in the case of gypsum board, the process typically involves discharging a cover sheet onto a moving conveyor. Since gypsum board is normally formed "face down," this cover sheet is the "face" cover sheet in such embodiments.

Dry and/or wet components of the gypsum slurry are fed to a mixer (e.g., pin mixer), where they are agitated to form the gypsum slurry. The mixer comprises a main body and a discharge conduit (e.g., a gate-canister-boot arrangement as known in the art, or an arrangement as described in U.S. Pat. Nos. 6,494,609 and 6,874,930). In some embodiments, the discharge conduit can include a slurry distributor with either a single feed inlet or multiple feed inlets, such as those described in U.S. Patent Application Publication 2012/0168527 A1 (application Ser. No. 13/341,016) and U.S. Patent Application Publication 2012/0170403 A1 (application Ser. No. 13/341,209), for example. In those embodiments, using a slurry distributor with multiple feed inlets, the discharge conduit can include a suitable flow splitter, such as those described in U.S. Patent Application Publication 2012/0170403 A1. Foaming agent can be added in the discharge conduit of the mixer (e.g., in the gate as described, for example, in U.S. Pat. Nos. 5,683,635 and 6,494,609) or in the main body if desired. Slurry discharged from the discharge conduit after all ingredients have been added, including foaming agent, is the primary gypsum slurry and will form the board core. This board core slurry is discharged onto the moving face cover sheet.

The face cover sheet may bear a thin skim coat in the form of a relatively dense layer of slurry. Also, hard edges, as known in the art, can be formed, e.g., from the same slurry stream forming the face skim coat. In embodiments where foam is inserted into the discharge conduit, a stream of secondary gypsum slurry can be removed from the mixer body to form the dense skim coat slurry, which can then be used to form the face skim coat and hard edges as known in the art. If included, normally the face skim coat and hard edges are deposited onto the moving face cover sheet before the core slurry is deposited, usually upstream of the mixer. After being discharged from the discharge conduit, the core slurry is spread, as necessary, over the face cover sheet (optionally bearing skim coat) and covered with a second cover sheet (typically the "back" cover sheet) to form a wet assembly in the form of a sandwich structure that is a precursor to the final product. The second cover sheet may optionally bear a second skim coat, which can be formed from the same or different secondary (dense) gypsum slurry as for the face skim coat, if present. The cover sheets may be formed from paper, fibrous mat or other type of material (e.g., foil, plastic, glass mat, non-woven material such as blend of cellulosic and inorganic filler, etc.).

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln). It also is common in the manufacture of gypsum board to use vibration in order to eliminate large voids or air pockets from the deposited slurry. Each of the above steps, as well as processes and equipment for performing such steps, are known in the art.

The starch characterized by mid-range viscosity of the invention can be used in formulating various products, such as, for example, gypsum wallboard, acoustical (e.g., ceiling) tile, joint compound, gypsum-cellulosic fiber products, such as gypsum-wood fiber wallboard, and the like. In some embodiments, such product can be formed from slurry according to embodiments of the invention.

As such, the pregelatinized starch characterized by mid-range viscosity can have beneficial effect, as described herein, in product besides paper-faced gypsum board in embodiments of the invention. For example, pregelatinized starch characterized as having a mid-range viscosity can be used in mat-faced products (e.g., woven) where board cover sheets are in the form of fibrous mats. The mats can optionally bear a finish to reduce water permeability. Other ingredients that can be included in making such mat-faced product, as well as materials for the fibrous mats and methods of manufacture, are discussed in, e.g., U.S. Pat. No. 8,070,895, as well as U.S. Patent Application Publication 2009/0247937.

In addition, gypsum-cellulosic product can be in the form of cellulosic host particles (e.g., wood fibers), gypsum, pregelatinized starch of mid-range viscosity, and other ingredients (e.g., water resistant additives such as siloxanes) as desired. Other ingredients and methods of manufacture are discussed in, e.g., U.S. Pat. Nos. 4,328,178; 4,239,716; 4,392,896; 4,645,548; 5,320,677; 5,817,262; and 7,413,603.

Pregelatinized starch having the mid-range viscosity characteristic can also be included in joint compound formulations, including both dry and ready-mix embodiments. The benefit of the invention is not limited to embodiments including calcined gypsum since the pregelatinized starch of mid-range viscosity in accordance with some embodiments can have good bond and can enhance strength with other components, e.g., non-setting components such as calcium carbonate and the like. To inhibit premature setting in some ready-mix embodiments, set retardant is also desirably included in some embodiments as one of ordinary skill in the art will appreciate. For example, U.S. Pat. Nos. 4,661,161; 5,746,822; and U.S. Patent Application Publication 2011/

0100844 describe set retarders (e.g., phosphate such as tetra sodium pyrophosphate (TSPP), polyacrylic acid and/or salt thereof, or the like), and other ingredients (e.g., latex emulsion binder, thickener, phosphate as described herein, and the like, or combinations thereof, etc) that may be useful in accordance with the present invention. Other ingredients and methods of making and using joint compound are discussed in, e.g., U.S. Pat. Nos. 6,406,537 and 6,805,741; as well as U.S. Patent Application Publication 2008/0305252.

The pregelatinized starch characterized by mid-range viscosity according to embodiments of the invention also can be used with various types of acoustical panels (e.g., ceiling tile). The starch can be mixed with calcined gypsum, water, and other ingredients as desired in some embodiments. However, the pregelatinized starch of mid range viscosity in accordance with some embodiments is not limited to use with calcined gypsum. The pregelatinized starch of mid-range viscosity in accordance with some embodiments can provide good bond between starch and non-setting components such as fibers (e.g., mineral wool and the like). In some embodiments, the panel has a Noise Reduction Coefficient of at least about 0.5 (e.g., at least about 0.7 or at least about 1) according to ASTM C 423-02. See, e.g., U.S. Pat. Nos. 1,769,519; 6,443,258; 7,364,015; 7,851,057; and 7,862,687 for discussion of ingredients and methods for making acoustical tile.

Thus, in an embodiment, board comprises a set gypsum core disposed between two cover sheets, the core formed from a slurry comprising stucco, water and at least one pregelatinized starch, wherein the starch has the characteristic of a viscosity from about 20 centipoise to about 700 centipoise when the viscosity is measured with the starch under the conditions according to the VMA method (see Example 1). Having the characteristic does not mean that the starch is added while under the conditions of the VMA test, but rather that when the starch is subjected to the VMA test, the characteristic is met.

In another embodiment, the viscosity characteristic of the starch is from about 25 centipoise to about 500 centipoise under the conditions according to the VMA method.

In another embodiment, the viscosity characteristic of the starch is from about 30 centipoise to about 300 centipoise under the conditions according to the VMA method.

In another embodiment, the viscosity characteristic of the starch is from about 30 centipoise to about 200 centipoise under the conditions according to the VMA method.

In another embodiment, the starch is effective to increase the core hardness of the set gypsum core relative to the set gypsum core without the starch.

In another embodiment, the starch requires an increase in the amount of excess water needed to be added to the slurry to maintain the slurry fluidity at the same level it would be without the starch that is less than the increase in the amount of excess water needed by a starch having a viscosity greater than 700 centipoise (e.g., 773 centipoise).

In another embodiment, the starch is in an amount from about 0.1% to about 10% by weight of the stucco.

In another embodiment, the starch is in an amount from about 0.3% to about 4% by weight of the stucco.

In another embodiment, the starch is in an amount from about 0.5% to about 3% by weight of the stucco.

In another embodiment, the starch is acid-modified starch.

In another embodiment, the acid-modified starch is acid-modified by sulfuric acid.

In another embodiment, the board core is characterized as having a compressive strength of at least about 1900 (e.g., at least about 1950, at least about 2000, at least about 2050, at least about 2100, at least about 2150, at least about 2200, etc.) psi when the slurry is cast according to the 2 inch cube test (absent any foam).

In another embodiment, the slurry has a water/stucco ratio from about 0.4 to about 1.3.

In another embodiment, the water/stucco ratio is from about 0.45 to about 0.85.

In another embodiment, the water/stucco ratio is from about 0.55 to about 0.8.

In another embodiment, the board has a density from about 24 pcf to about 40 pcf.

In another embodiment, the board has a density from about 24 pcf to about 37 pcf.

In another embodiment, the board has a density from about 24 pcf to about 35 pcf.

In another embodiment, the board has a density from about 27 pcf to about 34 pcf.

In another embodiment, the board has a density of about 30 pcf to about 34 pcf.

In another embodiment, the slurry comprises a second type of starch that is (a) not gelatinized, (b) is a pregelatinized starch having viscosity below 20 centipoise, and/or (c) is a pregelatinized starch having viscosity above 700 centipoise.

In another embodiment, the second type of starch comprises alkylated starch.

In another embodiment, the second type of starch comprises ethylated starch.

In another embodiment, the slurry further comprises at least foaming agent comprising a major weight portion of unstable component and a minor weight portion of stable component, the amount of foaming agent and the weight ratio of the unstable component to stable component effective to form a void distribution within the set gypsum core.

In another embodiment, the foaming agent is in an amount of about 0.1% or less by weight based on the weight of the stucco.

In another embodiment, the slurry further comprises at least one dispersant.

In another embodiment, the dispersant is naphthalene-sulfonate.

In another embodiment, the dispersant is in an amount from about 0.1% to about 3% by weight based on the weight of the stucco.

In another embodiment, the slurry further comprises a polyphosphate.

In another embodiment, the phosphate is sodium trimetaphosphate.

In another embodiment, the phosphate is in an amount from about 0.5% to about 5% by weight of the stucco.

In another embodiment, the phosphate is water-soluble and is present in an amount from about 0.12% to about 0.4% by weight of the stucco.

In another embodiment, at least one cover sheet has a weight basis of at least about 45 lbs/MSF.

In another embodiment, the pregelatinized starch is a flour that contains starch (e.g., corn flour), such as a flour containing at least about 75% starch by weight of the flour.

In another embodiment, the pregelatinized starch is partially pregelatinized.

In another embodiment, when the board is cast at a thickness of about ½ inch, the board has a nail pull resistance of at least about 65 pounds, as determined according to ASTM standard C473.

In another embodiment, when the board is cast at a thickness of about ½ inch, the board has a nail pull resistance of at least about 72 pounds, as determined according to ASTM standard C473.

In another embodiment, when the board is cast at a thickness of about ½ inch, the board has a nail pull resistance of at least about 77 pounds, as determined according to ASTM standard C473.

In another embodiment, the board has a core hardness of at least about 11 lb, as determined according to ASTM C473.

In another embodiment, a slurry comprises water, stucco, and at least one pregelatinized starch, wherein the starch has a characteristic of a viscosity from about 20 centipoise to about 700 centipoise when the viscosity is measured when the starch is subject to the conditions according to the VMA method.

In another embodiment, gypsum product is made from the slurry.

In another embodiment, product is selected from the group consisting of gypsum wallboard, acoustical (e.g., ceiling) tile, joint compound, gypsum-cellulosic fiber products, such as gypsum-wood fiber wallboard, and the like.

In another embodiment, joint compound comprises calcium carbonate, and at least one pregelatinized starch, wherein the starch has a viscosity from about 20 centipoise to about 700 centipoise, and wherein the viscosity is measured according to the VMA method. In some embodiments, the joint compound further comprises calcined gypsum, water and/or set retarder.

In another embodiment, acoustical panel comprises an acoustical component comprising fiber and at least one pregelatinized starch, wherein the starch has a viscosity from about 20 centipoise to about 700 centipoise, wherein the viscosity is measured according to the VMA method, and wherein the panel has a Noise Reduction Coefficient of at least about 0.5 according to ASTM C 423-02. In some embodiments, the fibers comprise mineral wool.

In another embodiment, a method of making board comprises (a) mixing at least water, stucco, and at least one pregelatinized starch to form a slurry, wherein the starch has a characteristic of a viscosity from about 20 centipoise to about 700 centipoise when the viscosity is measured with the starch under the conditions according to the VMA method; (b) disposing the slurry between a first cover sheet and a second cover sheet to form a wet assembly; (c) cutting the wet assembly into a board; and (d) drying the board.

In another embodiment, the pregelatinized starch is partially gelatinized when added to the slurry, with additional gelatinization taking place in the drying step.

In another embodiment, the pregelatinized starch becomes fully gelatinized in the drying step.

In another embodiment, the pregelatinized starch is fully gelatinized when added to the slurry or in formulating product.

In another embodiment, the method of making board further comprises gelatinizing the starch at a temperature at or above the gelatinization temperature of the starch (at least about 90° C. such as about 95° C.) for at least 10 minutes prior to adding it to the slurry or in formulating product.

In another embodiment, the starch is pressure cooked (e.g., via superheating at temperatures above about 100° C.) to effect gelatinization of the starch prior to inclusion in the gypsum slurry or in formulating product.

In another embodiment, the amount of water added required to be dried off is less than the amount of water dried off when using a pregelatinized starch having a viscosity over 700 centipoise in the otherwise same slurry or other medium for formulating product.

It shall be noted that the preceding are merely examples of embodiments. Other exemplary embodiments are apparent from the entirety of the description herein. It will also be understood by one of ordinary skill in the art that each of these embodiments may be used in various combinations with the other embodiments provided herein.

The following examples further illustrate the invention but, of course, should not be construed as in any way limiting its scope.

Example 1—Viscosity Measurement Method

This example sets forth the viscosity measurement assay method, referred to herein as the "VMA method." When viscosity is referred to herein, it is in accordance with the VMA method, unless otherwise indicated. The viscosity is measured using a Discovery HR-2 Hybrid Rheometer (TA Instruments Ltd) with a concentric cylinder, a standard cup (diameter of 30 mm) with vane geometry (diameter of 28 mm and length of 42.05 mm).

When the starch is obtained, differential scanning calorimetry (DSC) techniques are used to determine whether the starch is fully gelatinized. It is to be noted that even if the starch manufacturer identifies the starch as "fully gelatinized," the DSC step should be utilized to ensure that the starch is fully gelatinized, e.g., to confirm that no retrogradation has occurred. One of two procedures is adopted, depending on the temperature required to fully gelatinize the starch, which can also be determined by DSC as one of ordinary skill in the art will appreciate.

Procedure 1 is utilized where the DSC reveals that the starch is fully gelatinized or has a gelatinization temperature at or below 90° C. Procedure 2 is utilized where the gelatinization temperature is above 90° C. Since the viscosity is measured while the starch is in water, procedure 2 uses pressure cooking in a sealed vessel to allow for superheating to temperatures above 100° C. without causing the water to appreciably evaporate. Procedure 1 is reserved for starches already fully gelatinized or for starches having gelatinization temperature up to 90° C., because, as discussed below, the gelatinization takes place in the rheometer which is an open system and cannot create pressurized conditions for gelatinization. Thus procedure 2 is followed for starches having higher gelatinization temperatures. Either way, starch (7.5 g, dry basis) is added into water for a total weight of 50 g when the viscosity is measured.

In procedure 1, the starch is dispersed in the water (15% starch of the total weight of starch and water) and the sample is immediately transferred to a cylinder cell. The cell is covered with aluminum foil. The sample is heated from 25° C. to 90° C. at 5° C./min and a shear rate of 200 $s^{-1}$. The sample is held at 90° C. for 10 min at a shear rate of 200 $s^{-1}$. The sample is cooled from 90° C. to 80° C. at 5° C./min and a shear rate of 200 $s^{-1}$. The sample is held at 80° C. for 10 min at a shear rate of 0 $s^{-1}$. The viscosity of the sample is measured at 80° C. and a shear rate of 100 $s^{-1}$ for 2 min. The viscosity is the average of the measurement from 30 seconds to 60 seconds.

Procedure 2 is used for starches having gelatinization temperature greater than 90° C. The starch is gelatinized according to the methods well-known in the starch industry (e.g., by pressure cooking). The gelatinized starch water solution (15% of total weight) is immediately transferred into the rheometer measuring cup and equilibrated at 80° C. for 10 minutes. The viscosity of the sample is measured at 80° C. and a shear rate of 100 s$^{-1}$ for 2 minutes. The viscosity is the average of the measurement from 30 seconds to 60 seconds.

Example 2—Viscosity of Starch at Different States

Figure 1:
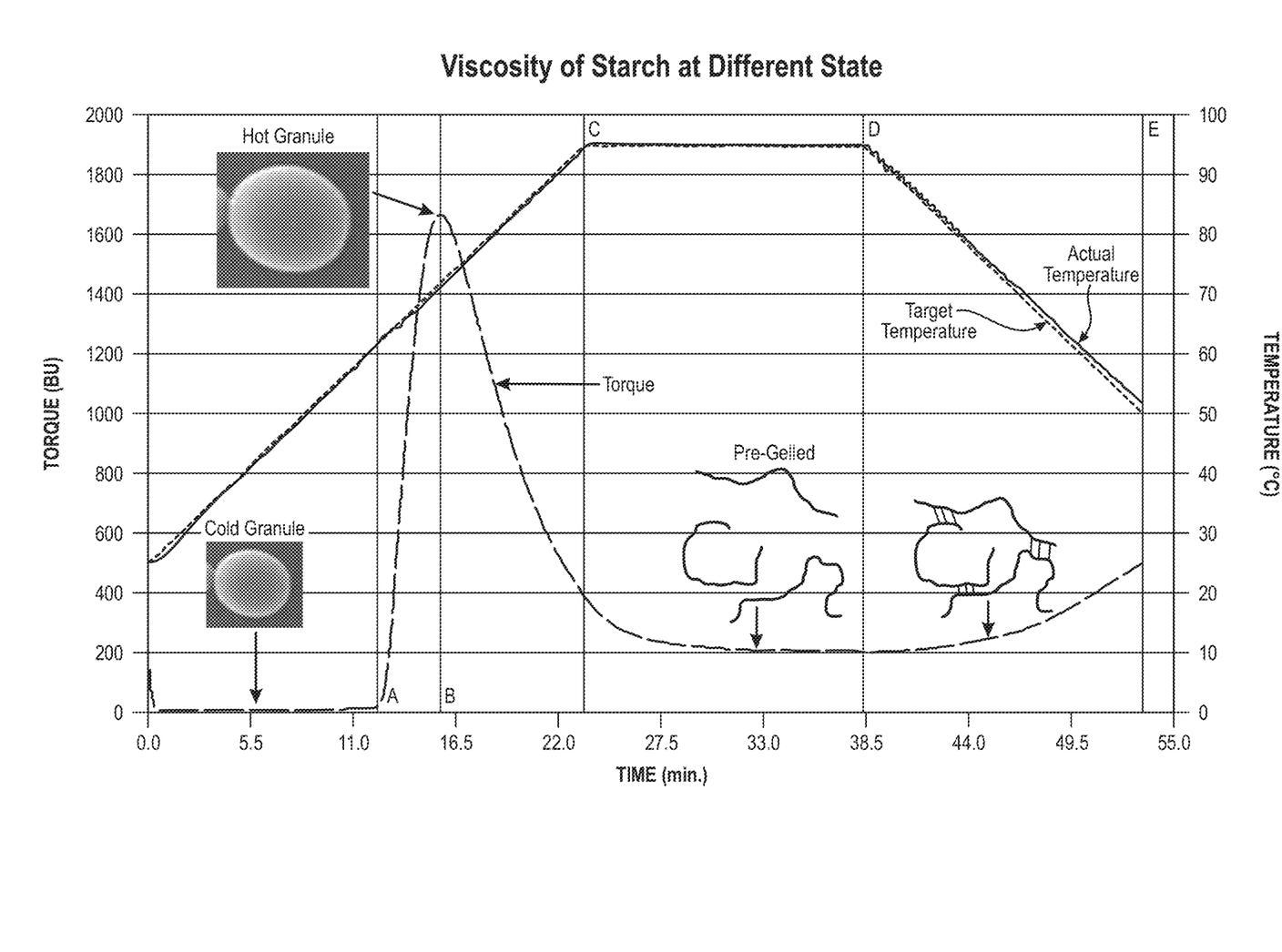
FIG. 1 is a viscogram developed from viscograph, illustrating the viscosity of starch at different states, where the X-axis is time and the Y-axis superimposes torque (primary Y-axis, on the left) and temperature (secondary Y-axis, on the right), in accordance with embodiments of the invention.

This Example illustrates the viscosity of starch (in 15% solution in water) at different states. The representative starch tested was hydroxyethyl corn starch (Clineo 706, available from ADM). Referring to FIG. 1, the X-axis reflects time, while the Y-axis superimposes torque and temperature. The graph demonstrates how the viscosity changes as the starch is cooked and is ultimately gelatinized. The torque measures the force to turn the rotor and therefore is a measurement of viscosity. The torque is in Brabender Units.

One of ordinary skill in the art will readily recognize Brabender units. For example, briefly, a C.W. Brabender Viscograph can be used, e.g., a Viscograph-E that uses reaction torque for dynamic measurement. The Viscograph-E is commercially available from C.W. Brabender Instruments, Inc., Hackensack, N.J. It is to be noted that, as defined herein, the Brabender units are measured using a sample cup size of 16 fl. oz 500 cc), with a 700 cmg cartridge at an RPM of 75. One of ordinary skill in the art also will readily recognize that the Brabender units can be converted to other viscosity measurements, such as centipoise (e.g., cP=BU×2.1, when the measuring cartridge is 700 cmg) or Krebs units, as described therein.

The torque (viscosity) and temperature curves, respectively, are labeled in FIG. 1. With respect to temperature, the target and actual temperatures are superimposed on each other but there is not an appreciable difference.

As seen from the viscogram of FIG. 1, the granule, i.e., the physical structure of native starch, is identified as "cold" at low temperature and "hot" above 80° C. At low temperature, before gelatinization, the viscosity does not appreciably change. As the granule is heated, it will absorb water and swell. Beginning at the peak of the torque curve, the granule is hot and swollen enough that the granular structure begins to break and separate into loose molecules. As the granular structure breaks down, the viscosity decreases until the starch is fully gelatinized as shown at the trough of the curve. As the curve levels off at the trough, the solution is cooled. As a result, retrogradation occurs as the gelatinized molecule begins to reassociate and the viscosity starts to increase again.

Example 3—Cube Formulation and Compressive Strength Test

This Example describes cube compressive testing using a 2 inch cube. In some embodiments, the cube compressive test measures a gypsum formulation where the starch and its amount can vary as described herein. The formulation is formed from a gypsum slurry that is set with an input for water/stucco ratio at 1.0, with the amount of starch set at 2% by weight of stucco, unless otherwise indicated.

For starch requiring gelatinization at lab (e.g., all Clinton series, Clineo series, S23F, LC211, identified below): starch was dispersed in water and heated to boiling for 10 min with continuous stirring. The starch solution was then cooled to 78° F. and transferred into the mixing cup of a Waring blender. Sodium trimetaphosphate ("STMP") 10% solution, dispersant, and retarder were weighed into starch solution and mixed. Stucco and HRA were weighed and mixed as dry mix. The stucco and HRA dry mix was poured into the starch solution, soaked for 10 seconds and mixed at high speed for 10 seconds. Molds of 2 inch cubes were filled to a point slightly above the tops of the molds. The excess was scraped as soon as the plaster set. The cubes were removed from the molds after they hardened. The cubes were dried at 110° F. for 48 hours.

For water soluble starches (e.g., extruded hydroxypropyl pea starch, Maltrin M040, Maltrin M100, identified below): starch was dissolved in room temperature water. Follow the same procedure for starch requiring gelatinization at lab except skipping heating and cooling steps. As an alternative, soluble starch can be prepared in a dry mix with stucco and heat-resistant accelerator, then mixed with liquid ingredients (water, STMP, dispersant, and retarder).

For granular starch: starch was weighed into dry mix (stucco and HRA). Water, sodium trimetaphosphate 10% solution, dispersant, and retarder were weighed into the mixing cup. The dry mix was poured into water, soaked for 10 seconds, mixed at high speed for 10 seconds and the slurry immediately poured into the mold. The wet cube was wrapped with aluminum foil as soon as it hardened. The wrapped cube was heated at 190° F. for 90 min. The cube was unwrapped and dried at 110° F. for 48 hours The formulation of the gypsum slurry for forming the cube is set forth below in Table 3.

TABLE 3

| Gypsum Slurry Formulation with 2% Starch, 1.0 WSR | |
| --- | --- |
| Ingredient | Weight (g) |
| Stucco | 1550 |
| Water | 1522 |
| Starch | 31 |
| Dispersant | 7.75 |
| Sodium trimetaphosphate (STMP) 10% (w/w) solution | 31 |
| Heat resistant accelerator (HRA) | 13.2 |
| Retarder | 0.4 |

The dried cubes were removed from the oven and cooled at room temperature for 1 hour. The compressive strength was measured using a MTS system (Model #SATEC). The load is applied continuously and without a shock at speed of 0.04 inch/min (with a constant rate between 15 to 40 psi/s).

A cube was produced using extruded hydroxypropyl pea starch (Tackidex®K720 (Roquette)) by dissolving the starch in room temperature water, where the cube had a strength of 2106 psi. A cube was produced using extruded hydroxypropyl pea starch (Tackidex®K720 (Roquette)) by preparing the starch in a dry mix with stucco and heat-resistant accelerator, which was then mixed with liquid ingredients (water, STMP, dispersant, and retarder), where the cube had a strength of 2084 psi.

Example 4—Effect of Adding Gelatinized Starch into Stucco Slurry on Strength

This Example compares the effect of adding granular starch (i.e., non-gelatinized) into stucco slurry with adding gelatinized starches into stucco slurry on the respective compressive strengths of gypsum formulations. Each starch was put into a gypsum slurry for cube test, as described in Example 3.

Additional starches are shown in Table 4. One of the starches was not acid-modified, while the others were, as indicated in Table 4, below.

TABLE 4

Effect of Starch State (Granular or Pregelatinized) on Strength (PSI)

| Starch | Trade Name (Manufacturer) | Acid Modification | Granular (PSI) | Pregelatinized (PSI) |
|---|---|---|---|---|
| Native Corn Starch | Clinton 106 (ADM) | No | 1437 | 1642 |
| Acid-Modified Starch | Clinton 240 (ADM) | Yes | 1768 | 2121 |
| Acid Modified Starch | Supercore ® S22F (Grain Processing Corporation) | Yes | 1844 | 2014 |
| Acid-Modified Corn Starch | LC211 (ADM) | Yes | 1836 | 1905 |

This example illustrates the enhanced strength achieved with the input of pregelatinized starch in a gypsum slurry instead of a granular starch, in accordance with embodiments of the invention. Granular form provides good fluidity to stucco slurry due to the very low viscosity of granular starch. However, the granular form does not impart as good of a strength. Thus, the pregelatinized form is desirable.

Example 5—Viscosity and Compressive Strength for Gelatinized Starch

This Example illustrates different gelatinized starches that represent a range of viscosities as measured according to VMA method. The effect on the compressive strength in a gypsum formulation of each of the starches was evaluated, according to the formulation and cube test set forth in Example 3. Results showing the viscosity of the gelatinized starches and the compressive strengths of gypsum cubes formed from slurries comprising the starches are set forth below in Table 5.

TABLE 5

Viscosity and Strength for Gelatinized Starch

| Starch | Trade Name (Manufacturer) | Physical Modification (Gelatinization) | Chemical Modification | Viscosity (cP) | Strength (PSI) |
|---|---|---|---|---|---|
| Native Corn Starch | Clinton 106 (ADM) | At Lab | NA | 5140 | 1642 |
| Pregelatinized Corn Starch | NA | During Manufacture | NA | 773 | 2039 |
| Acid-modified Corn Starch | Clinton 240 (ADM) | At Lab | Yes | 660 | 2121 |
| Acid-modified Corn Starch | Clinton 260 (ADM) | At Lab | Yes | 430 | 2413 |
| Extruded Hydroxypropyl Pea Starch | Tackidex ®K720 (Roquette) | During Manufacture | Yes | 170 | 2254 |
| Acid-modified Corn Starch | Clinton 277 (ADM) | At Lab | Yes | 129 | 2252 |
| Acid-modified Corn Starch | Clinton 290 (ADM) | At Lab | Yes | 37 | 2282 |
| Acid-modified Starch | Supercore ® S23F (Grain Processing Corporation) | At Lab | Yes | 34 | 2290 |
| Maltodextrin | Maltrin M040 (Grain Processing Corporation) | During Manufacture | Yes | 6 | 1970 |
| Maltodextrin | Maltrin M100 (Grain Processing Corporation) | During Manufacture | Yes | 4 | 1983 |

Some of the starches were supplied commercially in an already-gelatinized form, and those starches are marked as gelatinized "during manufacture" in Table 5. Other starches were supplied without gelatinization, but were then gelatinized in the lab, as marked "at lab" in Table 5. In addition, some of the starches were chemically modified to achieve the indicated viscosity, as noted. With respect to the extruded hydroxypropyl pea starch, while not wishing to be bound to any particular theory, the low viscosity may be due to starch hydrolysis by high pressure high shear extrusion combined with hydroxypropylation and the high amylose content (35%). Each indicated viscosity is after gelatinization of the starch.

This Example demonstrates the desirability of including gelatinized starches having a mid-range viscosity, as set forth herein, in a cementitious (e.g., gypsum) slurry, in accordance with embodiments of the invention. The mid-range viscosity starches provide good fluidity, as reflected by the starch viscosity, while also achieving desirable strength properties. The good fluidity results in lower water demand in the gypsum slurry. By including less water in the gypsum slurry, less excess water must be dried off during manufacture, resulting in enhanced process efficiency and lower manufacturing costs.

Example 6—Gelatinization and Viscosity of Ethylated Starches

This Example compares ethylated starches exhibiting a range of viscosities after gelatinization. The effect on strength of a gypsum formulation, in view of adding granular (ungelatinized starch) and gelatinized starch, respectively, into stucco slurry was also evaluated according to the formulation and cube test set forth in Example 3. Results showing the viscosity of the gelatinized starches and the compressive strengths of gypsum cubes formed from slurries comprising the starches are set forth below in Table 6. Each indicated viscosity is after gelatinization of the starch, but the strength in view of adding granular starch (ungelatinized starch) into stucco slurry is also included in the data.

TABLE 6

Viscosity and Strength of Ethylated Starches

| Starch | Trade Name | Viscosity (cP) | Granular (PSI) | Pregelatinized (PSI) |
|---|---|---|---|---|
| Hydroxyethyl Corn Starch | Clineo 706 (ADM) | 495 | 1999 | 2122 |
| Hydroxyethyl Corn Starch | Clineo 714 (ADM) | 135 | 2166 | 2158 |
| Hydroxyethyl Corn Starch | Clineo 716 (ADM) | 34 | 2091 | 2137 |

While not wishing to be bound by any particular theory, ethylation decreases the gelatinization temperature of starch. These ethylated starches may be partially hydrolyzed to the appropriate viscosity.

This Example shows that these ethylated starches having the mid-range of viscosity after gelatinization, as described herein, provide desirable fluidity and strength when included in a gypsum formulation, in accordance with embodiments of the invention.

Example 7—Variation in Starch Amount on Strength

This Example compares the effect of gelatinized starches on the strength of a gypsum formulation, across a range of amounts of starch to be put into the gypsum slurry. The formulation and cube test set forth in Example 3 were used, except that the amount of starch was varied. The results are set forth in Table 7.

TABLE 7

Strength (PSI) vs. Starch Content in Gypsum Formulation (% by Weight in Stucco)

| Starch | Trade Name | 0.50% | 1.00% | 2.00% | 3.00% |
|---|---|---|---|---|---|
| Maltodextrin | Maltrin M100 (Grain Processing Corporation) | 1959 | 1981 | 1885 | 1810 |
| Extruded Hydroxypropyl Pea Starch | Tackidex ®K720 (Roquette) | 2042 | 2195 | 2195 | 2334 |

This Example demonstrates that even relatively low amounts of gelatinized starch provide desirable strength properties in gypsum formulation, in accordance with embodiments of the invention.

Example 8—Fluidity of Gypsum Slurry

This Example illustrates the effect on fluidity of gypsum slurry by various gelatinized starches. Each starch was put into a gypsum formulation according to Example 3, except that the water/stucco ratio and amount of starch were varied. A slump test was used to measure fluidity as follows. Slump was measured by pouring slurry into a 2 inch diameter cylinder that is 4" tall (open on each end and placed on end on a flat smooth surface) and screeding the top of the slurry off. This provides a set volume of slurry for every test. Then the cylinder was immediately lifted and the slurry rushed out the open bottom end of the cylinder. The diameter of this patty is measured in centimeters and recorded. A more fluid slurry will typically result in a larger diameter patty. The results are set forth in Table 8.

TABLE 8

Strength (PSI) vs. Starch Content in Gypsum Formulation (% by Weight of Stucco)

| Starch | Trade Name | Starch (%) | WSR | Slump (cm) |
|---|---|---|---|---|
| Pregelatinized Corn Starch | NA | 2 | 1 | 14.2, 16 (2 batches) |
| Acid-modified Corn Starch | Clinton 240 (ADM) | 2 | 1 | 20 |
| Acid-modified Corn Starch | Clinton 260 (ADM) | 2 | 1 | 18 |
| Acid-modified Corn Starch | Clinton 277 (ADM) | 2 | 1 | 22.5 |
| Acid-modified Corn Starch | Clinton 290 (ADM) | 2 | 1 | 22 |
| Extruded Hydroxypropyl Pea Starch | Tackidex ®K720 (Roquette) | 2 | 1 | 19 |
| Acid-modified Corn Starch | Clinton 277 (ADM) | 2 | 0.85 | 14.5 |
| Acid-modified Corn Starch | Clinton 290 (ADM) | 2 | 0.85 | 15 |
| Extruded Hydroxypropyl Pea Starch | Tackidex ®K720 (Roquette) | 2 | 0.85 | 12 |
| Extruded Hydroxypropyl Pea Starch | Tackidex ®K720 (Roquette) | 0.5 | 1 | 19.5 |
| Extruded Hydroxypropyl Pea Starch | Tackidex ®K720 (Roquette) | 0.5 | 0.85 | 13.5 |

This Example demonstrates the enhanced fluidity and lower water demand of gypsum formulations, in accordance with embodiments of the invention.

Example 9—Acid-Modification of Pre-Gelatinized Corn Flour in the Dry State

This Example demonstrates viscosity reduction of pre-gelatinized corn flour by dry state acid-modification. Pre-gelatinized corn flour (125 g, Bunge Milling) was weighed into a mixing bowl of a Hobart mixer. The top of the corn flour was sprayed with 1M sulfuric acid (6.2 to 18 g) while mixing at speed 2. The sample was mixed for another 10 min. The sample was transferred to a plastic bottle with a lid and then heated at 80° C. for 3 h. An equal mole of calcium hydroxide was added, and the sample was mixed for 2 min. The sample was dried at room temperature overnight.

Viscosities of acid-modified pre-gelatinized corn flour were measured according to the VMA method as described in Example 1. The data are shown in Table 9.

TABLE 9

| Starch | Starch Viscosity (cP) |
|---|---|
| 6.2 g 1M sulfuric acid modified | 308 |
| 9.4 g 1M sulfuric acid modified | 236 |
| 15 g 1M sulfuric acid modified | 179 |
| 18 g 1M sulfuric acid modified | 54 |

Example 10—Gypsum Slurry Formulation, Cube Compressive Strength, and Slurry Slump Test This Example describes cube compressive strength and slump using starches that have been acid-modified using varying amounts of acid. The gypsum slurry formulation used is shown in Table 3. The water stucco ratio (WSR) was 1.0. Sample gypsum cubes were prepared according to the method of Example 3. The slump test was followed as described in Example 8. Results of the compressive strength test and the slump test are shown in Table 10.

TABLE 10

| Starch | Slump (cm) | Compressive Strength (PSI) |
|---|---|---|
| Pre-gelatinized corn flour control | 13.5 | 2064 |
| 6.2 g 1M sulfuric acid modified | 14.5 | 2066 |
| 9.4 g 1M sulfuric acid modified | 15 | 2033 |
| 15 g 1M sulfuric acid modified | 15 | 2296 |
| 18 g 1M sulfuric acid modified | 16 | 2257 |

This Example demonstrates that reducing the viscosity of pre-gelatinized corn flour to mid-range not only overall increases fluidity of gypsum slurry, but also overall increases compressive strength. The combination of Examples 9 and 10 demonstrate the inverse relationship between starch viscosity and slurry fluidity.

Example 11—Acid-Modification of Pre-Gelatinized Corn Flour in 0.25N of Sulfuric Acid Solution This Example describes cube compressive strength and slump using starches that have been acid-modified using varying exposure time to acid. Pre-gelatinized corn flour (31 g) was weighed into a Warren blender containing water (200 g) while mixing. The starch solution was transferred into a flask. The blender was rinsed with water (77 g) and the water was transferred to the flask. Concentrated sulfuric acid (1.94 ml, 95-98%) was added into the starch solution while stirring. The solution was incubated at 70° C. for 60 to 100 min. An equal mole of calcium hydroxide (2.58 g) was then added into the starch solution and stirred for 10 min. The gypsum slurry formulation used is shown in Table 3. Sample gypsum cubes were prepared according to the method of Example 3. The slump test was followed as described in Example 8. Results of the compressive strength test and the slump test are shown in Table 11.

TABLE 11

| Starch | Slump (cm) | Compressive Strength (PSI) |
|---|---|---|
| Pre-gelatinized corn flour control | 13.5 | 2064 |
| 0.25N sulfuric acid incubated for 60 min | 16 | 2186 |
| 0.25N sulfuric acid incubated for 70 min | 16.3 | 2159 |
| 0.25N sulfuric acid incubated for 80 min | 17 | 2381 |
| 0.25N sulfuric acid incubated for 90 min | 18 | 2293 |
| 0.25N sulfuric acid incubated for 100 min | 18 | 2093 |

This Example shows acid-modification of pre-gelatinized corn flour in sulfuric acid solution can improve fluidity and strength.

Example 12—Fluidity of Gypsum Slurry at Different Water Stucco Ratios (WSR)

This Example illustrates the effect on fluidity of gypsum slurry by acid-modification of pre-gelatinized corn flour. A slump test was used to measure fluidity as described in Example 8. The gypsum slurry formulation used is shown in Table 3, except water amount was adjusted according to WSR. The results of slump test are shown in Table 12.

TABLE 12

| | Slump test (cm) | |
|---|---|---|
| Starch | WSR of 1.0 | WSR of 0.85 |
| Pre-gelatinized corn flour control | 12.7 | 9.0 |
| 0.25N sulfuric acid incubated for 90 min | 18 | 12.5 |

This Example demonstrates that acid-modified pre-gelatinized corn flour can maintain fluidity of gypsum slurry even after water was reduced by 15%.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:
1. A board comprising:
a set gypsum core disposed between two cover sheets, the core formed from a slurry comprising stucco, water and at least one pregelatinized starch, wherein the starch has a characteristic of a viscosity from about 35 centipoise to about 425 centipoise when the viscosity is measured while the starch is subjected to the conditions according to the VMA method,
wherein the pregelatinized starch is in an amount from about 0.5% to about 5% by weight of the stucco, the slurry requiring an increase in water demand to maintain a slurry fluidity at the same level that it would be without the pregelatinized starch that is less than the increase in water demand required by an otherwise identical slurry containing a starch having a viscosity above 425 centipoise according to the VMA method instead of the pregelatinized starch, the board having a core hardness of at least about 11 lb, as determined according to ASTM C473.

2. The board according to claim 1, wherein the viscosity characteristic of the pregelatinized starch is from about 35 centipoise to about 200 centipoise according to the VMA method.

3. The board according to claim 1, wherein the water/stucco ratio is from about 0.55 to about 0.8.

4. The board according to claim 1, wherein the board has a density from about 24 pcf to about 35 pcf.

5. The board according to claim 1, wherein the slurry comprises a second type of starch that is (a) not gelatinized, (b) is a pregelatinized starch having the characteristic of a viscosity below 35 centipoise according to the VMA method, and/or (c) is a pregelatinized starch having the characteristic of viscosity above 425 centipoise according to the VMA method.

6. The board according to claim 5 wherein the second type of starch comprises alkylated starch.

7. The board according to claim 1, wherein the slurry further comprises at least foaming agent comprising a major weight portion of unstable component and a minor weight portion of stable component, the amount of foaming agent and the weight ratio of the unstable component to stable component effective to form a void distribution within the set gypsum core.

8. The board according to claim 1, wherein the slurry further comprises naphthalenesulfonate dispersant, wherein the naphthalenesulfonate dispersant is in an amount from about 0.1% to about 3% by weight based on the weight of the stucco.

9. The board according to claim 1, wherein the slurry further comprises sodium trimetaphosphate, wherein the sodium trimetaphosphate is in an amount from about 0.12% to about 0.4% by weight of the stucco.

10. The board according to claim 1, wherein the pregelatinized starch is a flour that contains starch.

11. The board according to claim 1, wherein the pregelatinized starch is partially pregelatinized.

12. The board according to claim 1, wherein, when the board is cast at a thickness of about ½ inch, the board has a nail pull resistance of at least about 65 pounds, as determined according to ASTM standard C473.

13. A slurry comprising water, stucco, and at least one pregelatinized starch, wherein the pregelatinized starch has a characteristic of viscosity from about 35 centipoise to about 425 centipoise when the viscosity is measured while the pregelatinized starch is subjected to the conditions according to the VMA method, wherein the pregelatinized starch is in an amount from about 0.5% to about 5% by weight of the stucco;

the slurry requiring an increase in water demand to maintain a slurry fluidity at the same level that it would be without the pregelatinized starch that is less than the increase in water demand required by an otherwise identical slurry containing a starch having a viscosity above 425 centipoise according to the VMA method instead of the pregelatinized starch;

wherein when the slurry is used to make a board, the board has a core hardness of at least about 11 lb, as determined according to ASTM C473-10.

14. A product made from the slurry of claim 13.

15. An acoustical panel comprising an acoustical component comprising fiber and the slurry of claim 13.

16. A board comprising:

a set gypsum core disposed between two cover sheets, the core formed from a slurry comprising stucco, water and at least one pregelatinized starch, wherein the pregelatinized starch has a characteristic of a viscosity from about 35 centipoise to about 425 centipoise when the viscosity is measured while the pregelatinized starch is subjected to conditions according to VMA method;

wherein the slurry has a water/stucco ratio from about 0.4 to about 0.9 and the pregelatinized starch is in an amount from about 0.5% to about 3% by weight of the stucco;

the slurry requiring an increase in water demand to maintain a slurry fluidity at the same level that it would be without the pregelatinized starch that is less than the increase in water demand required by an otherwise identical slurry containing a starch having a viscosity above 425 centipoise according to the VMA method instead of the pregelatinized starch;

the board having a core hardness of at least about 11 lb, as determined according to ASTM C473-10.

17. The board according to claim 16, wherein the viscosity characteristic of the pregelatinized starch is from about 35 centipoise to about 200 centipoise according to the VMA method.

18. A method of making board comprising:

(a) mixing at least water, stucco, and at least one pregelatinized starch to form a slurry, wherein the pregelatinized starch has a characteristic of a viscosity from about 35 centipoise to about 425 centipoise when the viscosity is measured according to the VMA method, wherein the pregelatinized starch is in an amount from about 0.5% to about 5% by weight of the stucco;

the slurry requiring an increase in water demand to maintain a slurry fluidity at the same level that it would be without the pregelatinized starch that is less than the increase in water demand required by an otherwise identical slurry containing a starch having a viscosity above 425 centipoise according to the VMA method instead of the pregelatinized starch;

(b) disposing the slurry between a first cover sheet and a second cover sheet to form a wet assembly;

(c) cutting the wet assembly into a board; and (d) drying the board, the board having a core hardness of at least about 11 lb, as determined according to ASTM C473-10.

19. The method of claim 18, wherein the pregelatinized starch is partially gelatinized when added to the slurry, with additional gelatinization taking place in the drying step (d).

20. The method of claim 18, further comprising gelatinizing the starch at or above the starch's gelatinization temperature for at least about 10 minutes prior to adding it to the slurry.

* * * * *